(12) United States Patent
Holtcamp

(10) Patent No.: US 6,806,328 B2
(45) Date of Patent: Oct. 19, 2004

(54) POLYMERIZATION CATALYST ACTIVATOR COMPLEXES AND THEIR USE IN A POLYMERIZATION PROCESS

(75) Inventor: Matthew W. Holtcamp, Huffman, TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 10/310,306

(22) Filed: Dec. 5, 2002

(65) Prior Publication Data

US 2003/0171514 A1 Sep. 11, 2003

Related U.S. Application Data

(60) Provisional application No. 60/352,469, filed on Jan. 28, 2002.

(51) Int. Cl.[7] .................................................. C08F 4/52
(52) U.S. Cl. ....................... 526/151; 502/103; 502/203; 502/231
(58) Field of Search ................................ 502/103, 231, 502/203, 114, 117; 556/7, 27; 526/133, 134, 135, 113, 114, 116

(56) References Cited

U.S. PATENT DOCUMENTS

| | | | |
|---|---|---|---|
| 6,031,145 A | 2/2000 | Commereuc et al. | 585/512 |
| 6,124,231 A * | 9/2000 | Fritze et al. | 502/152 |
| 6,147,174 A | 11/2000 | Holtcamp et al. | |
| 6,211,111 B1 | 4/2001 | Chen et al. | 502/152 |
| 6,214,760 B1 * | 4/2001 | Chen et al. | 502/103 |
| 6,248,445 B1 * | 6/2001 | Yamakawa et al. | 428/373 |
| 6,291,614 B1 * | 9/2001 | Chen et al. | 526/151 |

FOREIGN PATENT DOCUMENTS

| | | | |
|---|---|---|---|
| WO | WO 99/42467 | 8/1999 | |
| WO | WO 99/42467 A1 * | 8/1999 | C07F/5/02 |

OTHER PUBLICATIONS

Mulford et al., J. Am. Chem. Soc. 2000, 19, 35–42.*
V. Clifford Williams, et al., J. Am. Chem. Soc. 1999, 121, 3244–3245.
Mulord, Douglas R. et al., "*Group 4 and 5 metal derivatives of 2,2'–methylene–bis(6–phenylphenoxide),*" vol. 19, 35–42 (2000).
Chen, Eugene et al., "*Cocatalysts for Metal–Catalyzed Olefin Polymerization: Activators, Activation Processes, and Structure–Activity Relationships,*" vol. 100, 1391–1434 (2000).

* cited by examiner

Primary Examiner—David W. Wu
Assistant Examiner—Rip A Lee
(74) Attorney, Agent, or Firm—Lisa Kimes Jones; Kevin M. Faulkner

(57) ABSTRACT

The present invention includes polymerization catalyst activator complexes which include at least Group 13 metals. The activator complexes of the invention are prepared, in general, by reacting a halogenated aryl Group 13 metal compound with a diol. The activator compound is represented in one aspect by:

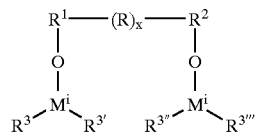

wherein each $M^1$ is a Group 13 atom; each $R^3$, $R^{3'}$, $R^{3''}$, and $R^{3'''}$ group is independently selected from, for example, $C_1$ to $C_{30}$ alkyls, halogenated $C_1$ to $C_{30}$ alkyls, $C_6$ to $C_{60}$ halogenated aryls; with the proviso that at least one of $R^3$, $R^{3'}$, $R^{3''}$, and $R^{3'''}$ is a fluorinated $C_6$ to $C_{60}$ aryl group; $R^1$ and $R^2$ are independently selected from substituted or unsubstituted $C_1$ to $C_{100}$ hydrocarbylenes; R, when present, is a substituted or unsubstituted $C_{30}$ hydrocarbylene; wherein when R is absent, $R^1$ and $R^2$ are bound together; and x is 0 or an integer from 1 to 100.

20 Claims, No Drawings

POLYMERIZATION CATALYST ACTIVATOR COMPLEXES AND THEIR USE IN A POLYMERIZATION PROCESS

CROSS-REFERENCE TO RELATED APPLICATION

This present application claims priority to U.S. Provisional Patent Application Serial No. 60/352,469 filed Jan. 28, 2002.

FIELD OF THE INVENTION

The present invention relates to polymerization catalyst activator compounds, to methods of making these activator compounds, to polymerization catalyst systems containing these activator compounds, and to polymerization processes utilizing the same. More particularly, the invention relates to activator complexes including at least two Group 13 metals comprising one or more halogenated aryl groups, the metals bound to the oxygen atoms of a diol.

BACKGROUND OF THE INVENTION

Polymerization catalyst compounds are typically combined with an activator (or co-catalyst) to yield compositions having a vacant coordination site that will coordinate, insert, and polymerize olefins. Typically, methylaluminoxane (MAO) is utilized to activate metallocene catalysts. Alternative activators for metallocenes and other single-site polymerization catalysts have been discovered in recent years.

Group 13 based Lewis acids having three fluorinated aryl substituents are known to be capable of activating transition metal compounds into olefin polymerization catalysts. Trisperfluorophenylborane is demonstrated in EP 0 425 697 and EP 0 520 732 to be capable of abstracting a ligand for cyclopentadienyl derivatives of transition metals while providing a stabilizing, compatible noncoordinating anion. The noncoordinating anions are described to function as electronic stabilizing cocatalysts, or counterions, for cationic metallocene complexes which are active for olefin polymerization. The term noncoordinating anion as used herein applies both to truly noncoordinating anions and coordinating anions that are at most weakly coordinated to the cationic complex so as to be labile to replacement by olefinically or acetylenically unsaturated monomers at the insertion site.

The synthesis of Group 13-based compounds derived from trisperfluorophenylborane are described in EP 0 694 548. These Group 13-based compounds are said to be represented by the formula $M^1 (C_6F_5)_3$ (where $M^i$ is a Group 13 metalloid such as aluminum or boron) and are prepared by reacting the trisperfluorophenylborane with dialkyl or trialkyl Group 13-based compounds at a molar ratio of "basically 1:1" so as to avoid mixed products, those including the type represented by the formula $M^i(C_6F_5)_nR_{3-n}$, where n=1 or 2. Utility for the tris-aryl aluminum compounds in Ziegler-Natta olefin polymerization is suggested.

U.S. Pat. No. 6,147,174 discloses an olefin polymerization process utilizing activator compounds of the formula $R_nAl(ArHal)_{3-n}$, where ArHal represents a halogenated aryl group and R represents a monoanionic group other than a halogenated aryl group.

V. C. Williams et al. 121 J. AM. CHEM. SOC. 3244–3245 (1999) disclose the synthesis of diborane activators (bis-pentafluorophenyl)boryl groups tethered via organic linkers. The problem with some of these Group 13-based activators in polyolefin polymerization is low activity, among other problems. What is need is an improved Group 13-based activator and method of polymerizing olefins that can utilize these metalloid-type activators.

SUMMARY OF THE INVENTION

The present invention solves these and other problems by providing a catalyst system and a method of polymerizing olefins, the catalyst system comprising a catalyst compound and an activator compound, wherein the activator compound is represented in one aspect by:

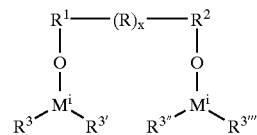

wherein each $M^1$ is a Group 13 atom;

each $R^3$, $R^{3'}$, $R^{3''}$, and $R^{3'''}$ group is independently selected from: $C_1$ to $C_{30}$ alkyls, $C_1$ to $C_{30}$ heteroatom containing alkyls, $C_1$ to $C_{30}$ alkoxys, halogenated $C_1$ to $C_{30}$ alkoxys, $C_2$ to $C_{30}$ alkenyls, $C_6$ to $C_{60}$ aryls, $C_6$ to $C_{60}$ aryloxys, halogenated $C_6$ to $C_{60}$ aryloxys, and $C_6$ to $C_{60}$ halogenated aryls; with the proviso that at least one of $R^3$, $R^{3'}$, $R^{3''}$, and $R^{3'''}$ is a fluorinated $C_6$ to $C_{60}$ aryl group $R^1$ and $R^2$ are independently selected from substituted or unsubstituted $C_1$ to $C_{100}$ hydrocarbylenes, aliphatic or aromatic;

R, when present, is a substituted or unsubstituted $C_{30}$ hydrocarbylene aliphatic or aromatic group; wherein when R is absent, $R^1$ and $R^2$ are bound together; and x is 0 or an integer from 1 to 100.

DETAILED DESCRIPTION

General Definitions

As used herein, the phrase "catalyst system" includes at least one "catalyst component" (or "catalyst compound") and at least one "activator", both of which are described further herein. The catalyst system may also include other components, such as supports, etc., and is not limited to the catalyst component and/or activator alone or in combination. The catalyst system may include any number of catalyst components in any combination as described herein, as well as any activator in any combination as described herein.

As used herein, the phrase "catalyst compound" includes any compound that, once appropriately activated, is capable of catalyzing the polymerization or oligomerization of olefins, the catalyst compound comprising at least one Group 3 to Group 12 atom or lanthanide atom, and optionally at least one leaving group bound thereto.

As used herein, the phrase "leaving group" refers to one or more chemical moieties bound to the metal center of the catalyst component that can be abstracted from the catalyst component by an activator, thus producing the species active towards olefin polymerization or oligomerization. The activator is described further below.

As used herein, in reference to Periodic Table "Groups" of Elements, the "new" numbering scheme for the Periodic Table Groups are used as in the CRC Handbook of Chemistry and Physics (David R. Lide ed., CRC Press 81$^{st}$ ed. 2000).

As used herein, a "hydrocarbyl" includes aliphatic, cyclic, olefinic, acetylenic and aromatic radicals (i.e., hydrocarbon radicals) comprising hydrogen and carbon that are deficient by one hydrogen. A "hydrocarbylene" is deficient by two hydrogens.

As used herein, an "alkyl" includes linear, branched and cyclic paraffin radicals that are deficient by one hydrogen. Thus, for example, a —CH$_3$ group ("methyl") and a CH$_3$CH$_2$— group ("ethyl") are examples of alkyls.

As used herein, an "alkenyl" includes linear, branched and cyclic olefin radicals that are deficient by one hydrogen; alkynyl radicals include linear, branched and cyclic acetylene radicals deficient by one hydrogen radical.

As used herein, "aryl" groups includes phenyl, naphthyl, pyridyl and other radicals whose molecules have the ring structure characteristic of benzene, naphthylene, phenanthrene, anthracene, etc. For example, a C$_6$H$_5^-$ aromatic structure is an "phenyl", a C$_6$H$_4^{2-}$ aromatic structure is an "phenylene". An "arylalkyl" group is an alkyl group having an aryl group pendant therefrom; an "alkylaryl" is an aryl group having one or more alkyl groups pendant therefrom.

As used herein, an "alkylene" includes linear, branched and cyclic hydrocarbon radicals deficient by two hydrogens. Thus, —CH$_2$— ("methylene") and —CH$_2$CH$_2$— ("ethylene") are examples of alkylene groups. Other groups deficient by two hydrogen radicals include "arylene" and "alkenylene".

As used herein, the phrase "heteroatom" includes any atom other than carbon and hydrogen that can be bound to carbon. A "heteroatom-containing group" is a hydrocarbon radical that contains a heteroatom and may contain one or more of the same or different heteroatoms. Non-limiting examples of heteroatom-containing groups include radicals of imines, amines, oxides, phosphines, ethers, ketones, oxoazolines heterocyclics, oxazolines, thioethers, and the like.

As used herein, an "alkylcarboxylate", "arylcarboxylate", and "alkylarylcarboxylate" is an alkyl, aryl, and alkylaryl, respectively, that possesses a carboxyl group in any position. Examples include C$_6$H$_5$CH$_2$C(O)O$^-$, CH$_3$C(O)O$^-$, etc.

As used herein, the term "substituted" means that the group following that term possesses at least one moiety in place of one or more hydrogens in any position, the moieties selected from such groups as halogen radicals (esp., Cl, F, Br), hydroxyl groups, carbonyl groups, carboxyl groups, amine groups, phosphine groups, alkoxy groups, phenyl groups, naphthyl groups, C$_1$ to C$_{10}$ alkyl groups, C$_2$ to C$_{10}$ alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals, and combinations thereof.

As used herein, structural formulas are employed as is commonly understood in the chemical arts; lines ("—") used to represent associations between a metal atom ("M", Group 3 to Group 12 atoms) and a ligand or ligand atom (e.g., cyclopentadienyl, nitrogen, oxygen, halogen ions, alkyl, etc.), as well as the phrases "associated with", "bonded to" and "bonding", are not limited to representing a certain type of chemical bond, as these lines and phrases are meant to represent a "chemical bond"; a "chemical bond" defined as an attractive force between atoms that is strong enough to permit the combined aggregate to function as a unit, or "compound".

A certain stereochemistry for a given structure or part of a structure should not be implied unless so stated for a given structure or apparent by use of commonly used bonding symbols such as by dashed lines and/or heavy lines.

Unless stated otherwise, no embodiment of the present invention is herein limited to the oxidation state of the metal atom "M" as defined below in the individual descriptions and examples that follow.

Activator Compounds

The present invention provides for new polymerization catalyst activator complexes which include two Group 13 metals, preferably boron and/or aluminum, more preferably both are aluminum atoms. The at least one of, and preferably both of, the two Group 13 metal atoms is also bonded to one or two halogenated aryl groups, preferably a C$_6$ or higher carbon number aromatic group, or a polycyclic aromatic group where one or more hydrogen atoms is replaced with a halogen, preferably fluorine. Each of the two Group 13 metal atoms are also bonded to a hydrocarbyl group through an oxygen atom.

The activator complexes of the invention are prepared, in general, by reacting a Group 13 metal compound comprising at least one halogenated aryl with a diol, desirably a C$_2$ to C$_{100}$ diol (see e.g., formula IV). In one embodiment, the Group 13 metal compound comprising at least one halogenated aryl is a compound such as tris(perfluorophenyl) boron, tris(perfluorophenyl)aluminum, tris (perfluoronaphthyl)boron or tris(perfluoronaphthyl) aluminum (see e.g., formula IIIb).

In one embodiment, the activator compound of the invention is represented by the following diol structure:

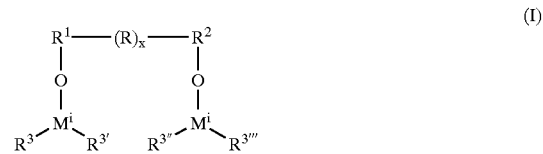

(I)

wherein each M$^1$ is selected independently from Group 13 atoms; and independently selected from boron and aluminum in a more particular embodiment; and is aluminum in yet a more particular embodiment;

x is 0 or an integer ranging from 1 to 100, or 1 to 50, or 1 to 10; with the proviso that when x is 0, R is absent and R$^1$ and R$^2$ are bound to each other;

R is a substituted or unsubstituted hydrocarbylene, aliphatic or aromatic, in one embodiment; and a C$_1$–C$_{30}$ hydrocarbylene, aliphatic or aromatic, in a more particular embodiment; and is selected from C$_1$ to C$_{20}$ alkylenes, C$_2$ to C$_{20}$ alkenylenes, C$_6$ to C$_{12}$ arylenes, C$_7$ to C$_{25}$ alkylarylenes, fluorinated versions thereof, chlorinated versions thereof, and hydroxylated versions thereof, wherein the level of fluorination/chlorination ranges from 50% to 100% of the hydrogens replaced by halogens in one embodiment, and all hydrogens replaced in a more particular embodiment;

each of R$^1$ and R$^2$ are divalent groups independently selected from: substituted and unsubstituted C$_1$ to C$_{100}$ hydrocarbylenes, and substituted and unsubstituted C$_1$ to C$_{100}$ heteroatom containing hydrocarbylenes in one embodiment; and C$_1$ to C$_{40}$ alkylenes, C$_2$ to C$_{40}$ alkenylenes, C$_6$ to C$_{12}$ arylenes, and C$_7$ to C$_{40}$ alkylarylenes in a more particular embodiment; and C$_1$ to C$_{100}$ linear or branched alkyls, C$_1$ to C$_{100}$ alkenyls, C$_1$ to C$_{10}$ cycloalkyls, C$_6$ to C$_{12}$ aryls, C$_7$ to C$_{25}$ aryl substituted alkyls or alkyl substituted aryls, C$_1$ to C$_{50}$ acyls, C$_1$ to C$_{100}$ aroyls, C$_1$ to C$_{50}$ alkoxys, C$_1$ to C$_{50}$ aryloxys, C$_1$ to C$_{50}$ alkylthiols, C$_1$ to C$_{50}$ alkylamines, C$_1$ to C$_{50}$ alkoxycarbonyl, C$_1$ to C$_{50}$ aryloxycarbonyl, and C$_1$ to C$_{50}$ carbamoyls in yet a more particular embodiment; and each $R^3$, $R^{3'}$, $R^{3''}$, and $R^{3'''}$ group is independently selected from: $C_1$ to $C_{30}$ alkyls, $C_1$ to $C_{30}$ heteroatom containing alkyls, halogenated $C_1$ to $C_{30}$ alkyls, $C_1$ to $C_{30}$ alkoxys, halogenated $C_1$ to $C_{30}$ alkoxys, $C_2$ to $C_{30}$ alkenyls, $C_6$ to $C_{60}$ aryls, $C_6$ to $C_{60}$ aryloxys, halogenated $C_6$ to $C_{60}$ aryloxys and $C_6$ to $C_{60}$ halogenated aryls in one embodiment; and $C_1$ to $C_{15}$ alkyls, $C_1$ to $C_{15}$ heteroatom containing alkyls, $C_1$ to $C_{30}$ halogenated alkyls, $C_2$ to $C_{15}$ alkenyls, $C_1$ to $C_{15}$ alkoxys, $C_6$ to $C_{12}$ aryls, $C_6$ to $C_{12}$ aryloxys, $C_6$ to $C_{12}$ halogenated aryls in a more particular embodiment; with the proviso that at least one of $R^3$, $R^{3'}$, $R^{3''}$, and $R^{3'''}$ is a fluorinated $C_6$ to $C_{60}$ aryl group, where the level of fluorination ranges from 50% hydrogens replaced by fluorine atoms, to 100% hydrogens replaced by fluorine atoms, and in a particular embodiment, 100% of the hydrogens are replaced by fluorine atoms.

For purposes of the present application, the use of the terms halogenated refers to the replacement of one or more hydrogen atoms on carbon atoms with a halogen atom, fluorine in a particular embodiment. In one embodiment, the aryl groups described herein are perhalogenated, preferably perfluorinated. In a particular embodiment, each of the $R^3$—$R^{3'''}$ groups is a fluorinated phenyl group, more preferably a perfluorinated phenyl group.

In structure (I), non-limiting examples of $R^3$—$R^{3'''}$ include: substituted or unsubstituted $C_1$ to $C_{30}$ hydrocarbyl aliphatic or aromatic groups, substituted meaning that at least one hydrogen on a carbon atom is replaced with a hydrocarbyl, halide, halocarbyl, hydrocarbyl or halocarbyl substituted organometalloid, dialkylamido, alkoxy, siloxy, aryloxy, alkylsulfido, arylsulfido, alkylphosphido, alkylphosphido or other anionic substituent; fluoride; bulky alkoxides, where bulky refers to $C_4$ and higher number hydrocarbyl groups, for example, up to $C_{20}$, such as tert-butoxide and 2,6-dimethylphenoxide, and 2,6-di(tert-butyl)phenoxide; —SR; —NR$_2$, and —PR$_2$, where each R is independently a substituted or unsubstituted hydrocarbyl as defined above; and, $C_1$ to $C_{30}$ hydrocarbyl substituted organometalloid, such as trimethylsilyl.

In one embodiment, the activator is represented by structure (I) where each $M^i$ is Al, $R^1$ and $R^2$ are $C_1$ to $C_{50}$ alkyl or alkyl substituted aryl groups, x is 0, and each $R^3$—$R^{3'''}$ is a fluorinated, preferably a perfluorinated, phenyl group.

More particularly, the activators useful in the present invention may be described by the diol structure (II):

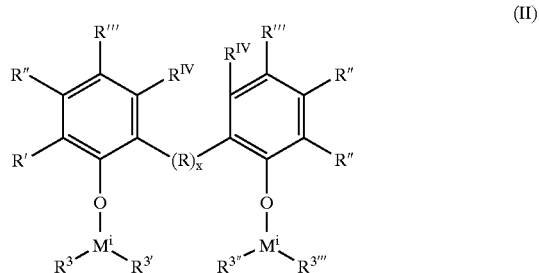

(II)

wherein $M^1$, R, x, and $R^3$—$R^{3'''}$ are as described above for structure (I); and wherein each of R', R'', R''' and $R^{IV}$ are independently selected from hydrogen radicals, halogen radicals, hydroxys, carboxyls, $C_1$ to $C_{10}$ alkyls, $C_1$ to $C_{10}$ alkoxys, $C_2$ to $C_{10}$ alkylenes, $C_6$ to $C_{12}$ aryls, $C_6$ to $C_{12}$ aryloxys, and $C_7$ to $C_{15}$ alkylaryls; and from fluorine atoms, chlorine atoms, hydroxys, $C_1$ to $C_6$ alkyls, and $C_2$ to $C_6$ alkylenes in a more particular embodiment; and selected from methyl, ethyl, n-propyl, n-butyl, isopropyl, isobutyl, and tert-butyl in yet a more particular embodiment.

The one or more activators of the invention may be used in combination with each other or in combination with other activators or methods of activation. For example, the activators of the invention may be used in combination with other activators including alkylalumoxanes, modified alkylalumoxanes, tri(n-butyl) ammonium tetrakis (pentafluorophenyl) boron, a trisperfluorophenyl boron metalloid precursor or a trisperfluoronaphthyl boron metalloid precursor, polyhalogenated heteroborane anions, trimethylaluminum, triethylaluminum, triisobutylaluminum, tri-n-hexylaluminum, tri-n-octylaluminum, tris(2,2',2"-nona-fluorobiphenyl) fluoroaluminate, perchlorates, periodates, iodates and hydrates, (2,2'-bisphenyl-ditrimethylsilicate) 4THF and organoboron-aluminum compound, silylium salts and dioctadecylmethylammonium-bis(tris(pentafluorophenyl)borane)-benzimidazolide or combinations thereof.

The activator compounds described above may be prepared by methods known in the art. In one embodiment, the activator compounds are prepared by reacting a Group 13 metal containing compound, preferably a halogenated aryl compound, with a diol. The Group 13 metal containing compound is represented by structures (IIIa) and (IIIb):

 (IIIa)

 (IIIb)

where $M^1$, $R^3$ are defined as above; and where n is 1 or 2; and wherein ArHal is a $C_6$ to $C_{30}$ perfluorinated aryl (all hydrogens replaced by fluorine radicals) in one embodiment, and is selected from perfluorophenyl and perfluoronaphthyl in a more particular embodiment. The diol is represented by:

 (IV)

where $R^1$, R, x and $R^2$ are defined as above in (I).

Generally the complexes are prepared by methods known in the art. For example, a perfluorophenyl aluminum complex may be slurried in an appropriate hydrocarbon solvent such as toluene or pentane. One-half equivalents of biphenol or other appropriate diols are added to the slurry or solution of the aluminum complex. The reaction is complete when the oxygen-bound hydrogens from the diol are consumed, either partially or completely, as desired. The resulting complex may be isolated by standard precipitation and/or crystallization techniques.

Catalyst Compounds

The activator of the invention may be utilized in conjunction with any suitable polymerization catalyst compound or compounds to polymerize olefin(s). Examples of suitable catalyst compounds include metallocene catalyst compounds, Group 15-containing metal polymerization catalyst compositions, and phenoxide-based catalyst compositions. The following is a non-limiting discussion of the various polymerization catalysts which may be utilized with the activator complex of this invention.

Group 15-Containing Catalyst Component

One aspect of the present invention includes the use of so called "Group 15-containing" catalyst components as described herein as a desirable catalyst component, either alone or for use with a metallocene or other olefin polymerization catalyst component. Generally, "Group 15-containing catalyst components", as referred to herein, include Group 3 to Group 12 metal complexes, wherein the metal is 2 to 4 coordinate, the coordinating moiety or moieties including at least two Group 15 atoms, and up to four Group 15 atoms. In one embodiment, the Group 15-containing catalyst component is a complex of a Group 4 metal and from one to four ligands such that the Group 4 metal is at least 2 coordinate, the coordinating moiety or moieties including at least two nitrogens. Representative Group 15-containing compounds are disclosed in, for example, WO 99/01460; EP A1 0 893,454; EP A1 0 894 005; U.S. Pat. Nos. 5,318,935; 5,889,128 6,333,389 B2 and 6,271,325 B1.

In one embodiment, the Group 15-containing catalyst components useful in the present invention include Group 4 imino-phenol complexes, Group 4 bis(amide) complexes, and Group 4 pyridyl-amide complexes that are active towards olefin polymerization to any extent.

The Group 15-containing catalyst component may be more particularly described by the following formula (V):

$$\alpha_a \beta_b \gamma_g M X_n \qquad (V)$$

wherein β and γ are groups that each comprise at least one Group 14 to Group 16 atom; and β (when present) and γ are groups bonded to M through between 2 and 6 Group 14 to Group 16 atoms, at least two atoms being Group 15-containing atoms;

more particularly, β and γ are groups selected from Group 14 and Group 15-containing: alkyls, aryls, alkylaryls, and heterocyclic hydrocarbons, and chemically bonded combinations thereof in one embodiment; and selected from Group 14 and Group 15-containing: $C_1$ to $C_{10}$ alkyls, $C_6$ to $C_{12}$ aryls, $C_6$ to $C_{18}$ alkylaryls, and $C_4$ to $C_{12}$ heterocyclic hydrocarbons, and chemically bonded combinations thereof in a more particular embodiment; and selected from $C_1$ to $C_{10}$ alkylamines, $C_1$ to $C_{10}$ alkoxys, $C_6$ to $C_{20}$ alkylarylamines, $C_6$ to $C_{18}$ alkylaryloxys, and $C_4$ to $C_{12}$ nitrogen containing heterocyclic hydrocarbons, and $C_4$ to $C_{12}$ alkyl substituted nitrogen containing heterocyclic hydrocarbons and chemically bonded combinations thereof in yet a more particular embodiment; and selected from anilinyls, pyridyls, quinolyls, pyrrolyls, pyrimidyls, purinyls, imidazyls, indolyls, $C_1$ to $C_6$ alkyl substituted groups selected from anilinyls, pyridyls, quinolyls, pyrrolyls, pyrimidyls, purinyls, imidazyls, indolyls; $C_1$ to $C_6$ alkylamine substituted groups selected from anilinyls, pyridyls, quinolyls, pyrrolyls, pyrimidyls, purinyls, imidazyls, indolyls, amine substituted anilinyls, pyridyls, quinolyls, pyrrolyls, pyrimidyls, purinyls, imidazyls, and indolyls; hydroxy substituted groups selected from anilinyls, pyridyls, quinolyls, pyrrolyls, pyrimidyls, purinyls, imidazyls, and indolyls; methyl-substituted phenylamines, and chemically bonded combinations thereof in yet a more particular embodiment;

α is a linking (or "bridging") moiety that, when present, forms a chemical bond to each of β and γ, or two γ's, thus forming a "γαγ" or "γαβ" ligand bound to M; α may also comprise a Group 14 to Group 16 atom which may be bonded to M through the Group 14 to Group 16 atom in one embodiment; and more particularly, α is a divalent bridging group selected from alkylenes, arylenes, alkenylenes, heterocyclic arylenes, alkylarylenes, heteroatom containing alkylenes, heteroatom containing alkenylenes and heterocyclic hydrocarbonylenes in one embodiment; and selected from $C_1$ to $C_{10}$ alkylenes, $C_2$ to $C_{10}$ alkenylenes, $C_6$ to $C_{12}$ arylenes, $C_1$ to $C_{10}$ divalent ethers, $C_6$ to $C_{12}$ O- or N-containing arylenes, $C_2$ to $C_{10}$ alkyleneamines, $C_6$ to $C_{12}$ aryleneamines, and substituted derivatives thereof in yet a more particular embodiment;

a is an integer from 0 to 2; a is either 0 or 1 in a more particular embodiment; and a is 1 in yet a more particular embodiment;

b is an integer from 0 to 2;

g is an integer from 1 to 2; wherein in one embodiment, a is 1, b is 0 and g is 2;

M is selected from Group 3 to Group 12 atoms and lanthanide atoms in one embodiment;

and selected from Group 3 to Group 10 atoms in a more particular embodiment;

and selected from Group 3 to Group 6 atoms in yet a more particular embodiment;

and selected from Ni, Cr, Ti, Zr and Hf in yet a more particular embodiment; and selected from Zr and Hf in yet a more particular embodiment;

each X is a leaving group; and n is an integer from 0 to 4 in one embodiment; and an integer from 1 to 3 in a more particular embodiment; and an integer from 2 to 3 in yet a more particular embodiment.

As used herein, "chemically bonded combinations thereof" means that adjacent groups, (β and γ groups) may form a chemical bond between them; in one embodiment, the β and γ groups are chemically bonded through one or more α groups there between.

As used herein, the terms "alkyleneamines", "aryleneamines", describe alkylamines and arylamines (respectively) that are deficient by two hydrogens, thus forming chemical bonds with two adjacent γ groups, or adjacent β and γ groups. Thus, an example of an alkyleneamine is —$CH_2CH_2N(CH_3)CH_2CH_2$—, and an example of a heterocyclic hydrocarbylene or aryleneamine is —$C_5H_3N$— (divalent pyridine). An "alkylene-arylamine" is a group such as, for example, —$CH_2CH_2(C_5H_3N)CH_2CH_2$—.

Described another way, the Group 15-containing catalyst component of the invention is represented by the structures (VI) and (VII):

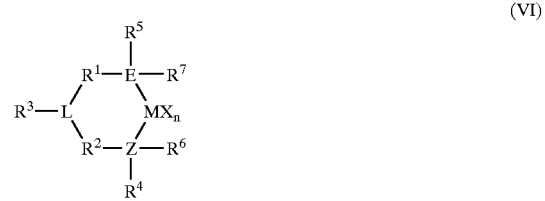

(VI)

(VII)

wherein E and Z are Group 15 elements independently selected from nitrogen and phosphorus in one embodiment; and nitrogen in a more particular embodiment;

L is selected from Group 15 atoms, Group 16 atoms, Group 15-containing hydrocarbylenes and a Group 16 containing hydrocarbylenes in one embodiment; wherein $R^3$ is absent when L is a Group 16 atom; in yet a more particular embodiment, when $R^3$ is absent, L is selected from heterocyclic hydrocarbylenes; and in yet a more particular embodiment, L is selected from nitrogen, phosphorous, anilinyls, pyridyls, quinolyls, pyrrolyls, pyrimidyls, purinyls, imidazyls, indolyls; $C_1$ to $C_6$ alkyl substituted groups selected from anilinyls, pyridyls, quinolyls, pyrrolyls, pyrimidyls, purinyls, imidazyls, and indolyls; $C_1$ to $C_6$ alkylamine substituted groups selected from anilinyls, pyridyls, quinolyls, pyrrolyls, pyrimidyls, purinyls, imidazyls, indolyls; amine substituted anilinyls, pyridyls, quinolyls, pyrrolyls, pyrimidyls, purinyls, imidazyls, and indolyls; hydroxy substituted groups selected from anilinyls, pyridyls, quinolyls, pyrrolyls, pyrimidyls, purinyls, imidazyls, and indolyls; methyl-substituted phenylamines, substituted derivatives thereof, and chemically bonded combinations thereof, L' is selected from Group 15 atoms, Group 16 atoms, and Group 14 atoms in one embodiment; and selected from Group 15 and Group 16 atoms in a more particular embodiment; and is selected from groups as defined by L above in yet a more particular embodiment, wherein "EZL" and "EZL'" may be referred to as a "ligand", the EZL and EZL' ligands comprising the R* and $R_1$–$R^7$ groups;

wherein L and L' may or may not form a bond with M;

y is an integer ranging from 0 to 2 (when y is 0, group L', *R and $R^3$ are absent);

M is selected from Group 3 to Group 5 atoms, Group 4 atoms in a more particular embodiment, and selected from Zr and Hf in yet a more particular embodiment;

n is an integer ranging from 1 to 4 in one embodiment; n is an integer ranging from 2 to 3 in a more particular embodiment;

each X is any leaving group in one embodiment; and more particularly, independently selected from halogen ions, hydride, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof; hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in yet a more particular embodiment; hydride, methyl, phenyl, phenoxy, benzoxy, tosyl, fluoromethyls and fluorophenyls in yet a more particular embodiment; $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls and $C_1$ to $C_{12}$ heteroatom-containing alkylaryls in yet a more particular embodiment; hydride, chloride, fluoride, bromide, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls in yet a more particular embodiment; and fluoride, chloride, bromide, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls) in yet a more particular embodiment;

$R^1$ and $R^2$ are independently: divalent bridging groups selected from alkylenes, arylenes, heteroatom containing alkylenes, heteroatom containing arylenes, substituted alkylenes, substituted arylenes and substituted heteroatom containing alkylenes, wherein the heteroatom is selected from silicon, oxygen, nitrogen, germanium, phosphorous, boron and sulfur in one embodiment; selected from $C_1$ to $C_{20}$ alkylenes, $C_6$ to $C_{12}$ arylenes, heteroatom-containing $C_1$ to $C_{20}$ alkylenes and heteroatom-containing $C_6$ to $C_{12}$ arylenes in a more particular embodiment; and in yet a more particular embodiment selected from —$CH_2$—, —$C(CH_3)_2$—, —$C(C_6H_5)_2$—, —$CH_2CH_2$—, —$CH_2CH_2CH_2$—, —$Si(CH_3)_2$—, —$Si(C_6H_5)_2$—, —$C_6H_{10}$—, —$C_6H_4$—, and substituted derivatives thereof, the substitutions including $C_1$ to $C_4$ alkyls, phenyl, and halogen radicals;

$R^3$ is absent in one embodiment; a group selected from hydrocarbyl groups, hydrogen radical, halogen radicals, and heteroatom-containing groups in a more particular embodiment; and selected from linear alkyls, cyclic alkyls, and branched alkyls having 1 to 20 carbon atoms in yet a more particular embodiment;

*R is absent in one embodiment; a group selected from hydrogen radical, Group 14 atom containing groups, halogen radicals, and a heteroatom-containing groups in yet a more particular embodiment;

$R^4$ and $R^5$ are independently: groups selected from alkyls, aryls, substituted aryls, cyclic alkyls, substituted cyclic alkyls, cyclic arylalkyls, substituted cyclic arylalkyls and multiple ring systems in one embodiment, each group having up to 20 carbon atoms, and between 3 and 10 carbon atoms in a more particular embodiment; selected from $C_1$ to $C_{20}$ alkyls, $C_1$ to $C_{20}$ aryls, $C_1$ to $C_{20}$ arylalkyls, and heteroatom-containing groups (for example $PR_3$, where R is an alkyl group) in yet a more particular embodiment; and $R^6$ and $R^7$ are independently: absent in one embodiment; groups selected from hydrogen radicals, halogen radicals, heteroatom-containing groups and hydrocarbyls in a more particular embodiment; selected from linear, cyclic and branched alkyls having from 1 to 20 carbon atoms in yet a more particular embodiment;

wherein $R^1$ and $R^2$ may be associated with one another, and/or $R^4$ and $R^5$ may be associated with one another as through a chemical bond.

Described yet more particularly, the Group 15-containing catalyst component can be described as the embodiments shown in structures (VIII), (IX) and (X):

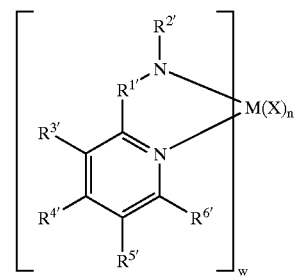

(VIII)

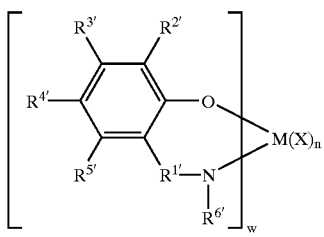

(IX)

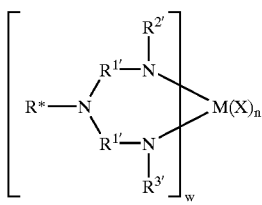

(X)

wherein structure (VIII) represents pyridyl-amide structures, structure (IX) represents imino-phenol structures, and structure (X) represents bis(amide) structures; wherein w is an integer from 1 to 3, and 1 or 2 in a more particular embodiment, and 1 in yet a more particular embodiment; M is a Group 3 to Group 12 element, a Group 3 to Group 6 element in a more particular embodiment, and a Group 4 element in yet a more particular embodiment; each X is independently selected from hydrogen radicals, halogen ions (desirably, anions of fluorine, chlorine, and bromine); $C_1$ to $C_6$ alkyls; $C_1$ to $C_6$ fluoroalkyls, $C_6$ to $C_{12}$ aryls; $C_6$ to $C_{12}$ fluoroalkyls, $C_1$ to $C_6$ alkoxys, $C_6$ to $C_{12}$ aryloxys, and $C_7$ to $C_{18}$ alkylaryloxys; n is an integer ranging from 0 to 4, and from 1 to 3 in a more particular embodiment, and from 2 to 3 in yet a more particular embodiment, and 2 in yet a more particular embodiment;

and further, wherein in structures (VIII), (IX) and (X), $R^{1'}$ is selected from hydrocarbylenes and heteroatom-containing hydrocarbylenes in one embodiment, and selected from —$SiR_2$—, alkylenes, arylenes, alkenylenes and substituted alkylenes, substituted alkenylenes and substituted arylenes in another embodiment; and selected from —$SiR_2$—, $C_1$ to $C_6$ alkylenes, $C_6$ to $C_{12}$ arylenes, $C_1$ to $C_6$ substituted alkylenes and $C_6$ to $C_{12}$ substituted arylenes in another embodiment, wherein R is selected from $C_1$ to $C_6$ alkyls and $C_6$ to $C_{12}$ aryls; and $R^{2'}, R^{3'}, R^{4'}, R^{5'}, R^{6'}$ and R* are independently selected from hydride, $C_1$ to $C_{10}$ alkyls, $C_6$ to $C_{12}$ aryls, $C_6$ to $C_{18}$ alkylaryls, $C_4$ to $C_{12}$ heterocyclic hydrocarbyls, substituted $C_1$ to $C_{10}$ alkyls, substituted $C_6$ to $C_{12}$ aryls, substituted $C_6$ to $C_{18}$ alkylaryls, and substituted $C_4$ to $C_{12}$ heterocyclic hydrocarbyls and chemically bonded combinations thereof in one embodiment; wherein R* is absent in a particular embodiment; and in another embodiment, R*—N represents a nitrogen containing group or ring such as a pyridyl group or a substituted pyridyl group that is bridged by the $R^{1'}$ groups. In yet another embodiment, R*—N is absent, and the $R^{1'}$ groups form a chemical bond to one another.

In one embodiment of structures (VIII), (IX) and (X), $R^{1'}$ is selected from methylene, ethylene, 1-propylene, 2-propylene, =$Si(CH_3)_2$, =$Si(phenyl)_2$, —CH=, —$C(CH_3)$=, —$C(phenyl)_2$—, —C(phenyl)=(wherein "=" represents two chemical bonds), and the like.

In a particular embodiment of structure (IX), $R^{2'}$ and $R^{4'}$ are selected from 2-methylphenyl, 2-n-propylphenyl, 2-iso-propylphenyl, 2-iso-butylphenyl, 2-tert-butylphenyl, 2-fluorophenyl, 2-chlorophenyl, 2-bromophenyl, 2-methyl-4-chlorophenyl, 2-n-propyl-4-chlorophenyl, 2-iso-propyl-4-chlorophenyl, 2-iso-butyl-4-chlorophenyl, 2-tert-butyl-4-chlorophenyl, 2-methyl-4-fluorophenyl, 2-n-propyl-4-fluorophenyl, 2-iso-propyl-4-fluorophenyl, 2-iso-butyl-4-fluorophenyl, 2-tert-butyl-4-fluorophenyl, 2-methyl-4-bromophenyl, 2-n-propyl-4-bromophenyl, 2-iso-propyl-4-bromophenyl, 2-iso-butyl-4-bromophenyl, 2-tert-butyl-4-bromophenyl, and the like.

In yet another particular embodiment of structures (VIII) and (X), $R^{2'}$ and $R^{3'}$ are selected from 2-methylphenyl, 2-n-propylphenyl, 2-iso-propylphenyl, 2-iso-butylphenyl, 2-tert-butylphenyl, 2-fluorophenyl, 2-chlorophenyl, 2-bromophenyl, 4-methylphenyl, 4-n-propylphenyl, 4-iso-propylphenyl, 4-iso-butylphenyl, 4-tert-butylphenyl, 4-fluorophenyl, 4-chlorophenyl, 4-bromophenyl, 6-methylphenyl, 6-n-propylphenyl, 6-iso-propylphenyl, 6-iso-butylphenyl, 6-tert-butylphenyl, 6-fluorophenyl, 6-chlorophenyl, 6-bromophenyl, 2,6-dimethylphenyl, 2,6-di-n-propylphenyl, 2,6-di-iso-propylphenyl, 2,6-di-isobutylphenyl, 2,6-di-tert-butylphenyl, 2,6-difluorophenyl, 2,6-dichlorophenyl, 2,6-dibromophenyl, 2,4,6-trimethylphenyl, 2,4,6-tri-n-propylphenyl, 2,4,6-tri-iso-propylphenyl, 2,4,6-tri-iso-butylphenyl, 2,4,6-tri-tert-butylphenyl, 2,4,6-trifluorophenyl, 2,4,6-trichlorophenyl, 2,4,6-tribromophenyl, 2,3,4,5,6-pentafluorophenyl, 2,3,4,5,6-pentachlorophenyl, 2,3,4,5,6-pentabromophenyl, and the like.

In another embodiment of structures (VIII), (IX) and (X), X is independently selected from fluoride, chloride, bromide, methyl, ethyl, phenyl, benzyl, phenyloxy, benzloxy, 2-phenyl-2-propoxy, 1-phenyl-2-propoxy, 1-phenyl-2-butoxy, 2-phenyl-2-butoxy and the like.

As used herein, "chemically bonded combinations" means that adjacent groups may form a chemical bond between them, thus forming a ring system, either saturated, partially unsaturated, or aromatic.

Non-limiting examples of the Group 15-containing catalyst component are represented by the structures (XIa–f):

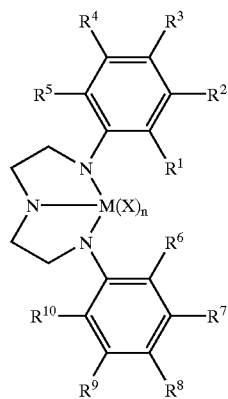

(XIa)

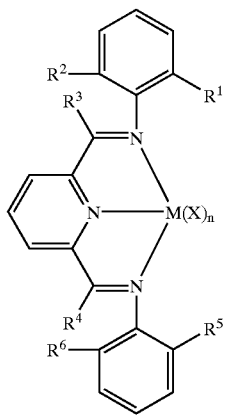
(XIb)

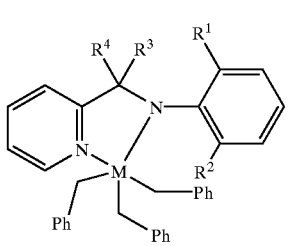
(XIc)

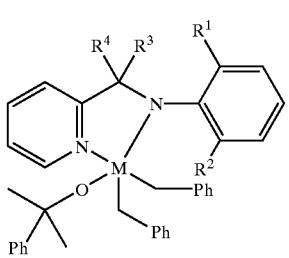
(XId)

(XIe)

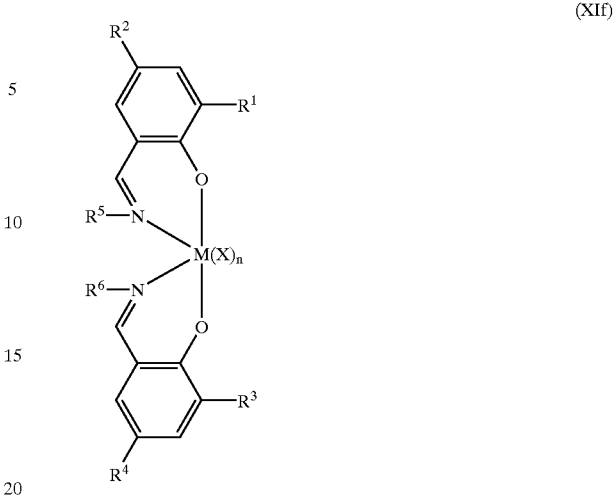
(XIf)

wherein each Ph in structures (XIa) through (XIf) is independently selected from phenyls and substituted phenyls in one embodiment, and are phenyls in a more particular embodiment; and M is selected from Group 4 atoms in one embodiment; and M is selected from Zr and Hf in a more particular embodiment; and wherein $R^1$ through $R_{10}$ in structures (XIa) through (XIf) are selected from hydride, fluorine radical, chlorine radical, bromine radical, methyl, ethyl, n-propyl, isopropyl, n-butyl, isobutyl, tert-butyl and phenyl; and X is selected from fluorine ion, chlorine ion, bromine ion, methyl, phenyl, benzyl, phenyloxy and benzyloxy; and n is an integer ranging from 0 to 4, and from 2 to 3 in a more particular embodiment.

The Group 15-containing catalyst components of the invention are prepared by methods known in the art, such as those disclosed in, for example, EP 0 893 454 A1, U.S. Pat. Nos. 5,889,128, 6,333,389 B2 and WO 00/37511.

The "Group 15-containing catalyst component" useful in the present invention may comprise any combination of any "embodiment" described herein.

Metallocene Catalyst Component

The catalyst system useful in the present invention may include one or more metallocene catalyst components as described herein. Metallocene catalyst compounds are generally described throughout in, for example, 1 & 2 METALLOCENE-BASED POLYOLEFINS (John Scheirs & W. Kaminsky eds., John Wiley & Sons, Ltd. 2000), and in particular, for use in the synthesis of polyethylene in 1 METALLOCENE-BASED POLYOLEFINS 261–377 (2000). The metallocene catalyst compounds as described herein include full "sandwich" compounds having two or more Cp ligands bound to at least one Group 3 to Group 12 metal atom, and one or more leaving group(s) bound to the at least one metal atom. Hereinafter, these compounds will be referred to as "metallocenes" or "metallocene catalyst components".

The Cp ligands are typically π-bonded and/or fused ring(s) or ring systems. The ring(s) or ring system(s) typically comprise atoms selected from Groups 13 to 16 atoms, and more particularly, the atoms that make up the Cp ligands are selected from carbon, nitrogen, oxygen, silicon, sulfur, phosphorous, germanium, boron and aluminum and a combination thereof. Even more particularly, the Cp ligand(s) are selected from substituted and unsubstituted cyclopentadienyl ligands and ligands isolobal to cyclopentadienyl, non-limiting examples of which include cyclopentadienyl, indenyl, fluorenyl and other structures. Examples of other Cp ligands include structures such as a pentadiene, cyclooctatetraenyl and imide compounds.

The metal atom "M" of the metallocene catalyst compound, as described throughout the specification and claims, may be selected from Groups 3 through 12 atoms in one embodiment; and selected from Groups 3 through 10 atoms in a more particular embodiment, and selected from Sc, Ti, Zr, Hf, V, Nb, Ta, Mn, Re, Fe, Ru, Os, Co, Rh, Ir, and Ni in yet a more particular embodiment; and selected from Groups 4, 5 and 6 atoms in yet a more particular embodiment, and a Ti, Zr, Hf atoms in yet a more particular embodiment. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

In one aspect of the invention, the one or more metallocene catalyst components of the invention are represented by the formula (XII):

$Cp^A Cp^B MX_n$ (XII)

wherein M is as described above; each X is chemically bonded to M; each Cp group is chemically bonded to M; and n is an integer from 0 to 4, and either 1 or 2 in a particular embodiment.

The ligands represented by $Cp^A$ and $Cp^B$ in formula (XII) may be the same or different cyclopentadienyl ligands or ligands isolobal to cyclopentadienyl, either or both of which may contain heteroatoms and ether or both of which may be substituted by a group R. Non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4$Ind"), substituted versions thereof, and heterocyclic versions thereof. In one embodiment, $Cp^A$ and $Cp^B$ are independently selected from the group consisting of cyclopentadienyl, indenyl, tetrahydroindenyl, fluorenyl, and substituted derivatives of each.

Independently, each $Cp^A$ and $Cp^B$ of formula (XII) may be unsubstituted or substituted with any one or combination of substituent groups R. Non-limiting examples of substituent groups R as used in structure (XII) as well as ring substituents in structures (XVIIa–d) include groups selected from hydrogen radicals, halogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkylcarbamoyls, acyloxys, acylaminos, aroylaminros, and combinations thereof.

More particular non-limiting examples of alkyl substituents R associated with formula (XII) through (XVII) include methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls such as, for example, fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins such as but not limited to olefinically unsaturated substituents including vinyl-terminated ligands, for example 3-butenyl, 2-propenyl, 5-hexenyl and the like. In one embodiment, at least two R groups, two adjacent R groups in one embodiment, are joined to form a ring structure having from 3 to 30 atoms selected from carbon, nitrogen, oxygen, phosphorous, silicon, germanium, aluminum, boron and combinations thereof. Also, a substituent group R group such as 1-butanyl may form a bonding association to the element M.

Each X in the formula (XII) above and for the formulas/structures below is independently selected from: any leaving group in one embodiment; and more particularly, selected from halogen ions, hydride, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof; hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in yet a more particular embodiment; hydride, methyl, phenyl, phenoxy, benzoxy, tosyl, fluoromethyls and fluorophenyls in yet a more particular embodiment; $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls and $C_1$ to $C_{12}$ heteroatom-containing alkylaryls in yet a more particular embodiment; hydride, chloride, fluoride, bromide, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls in yet a more particular embodiment; and fluoride, chloride, bromide, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls) in yet a more particular embodiment.

Other non-limiting examples of X groups in formula (XII) include amines, phosphines, ethers, carboxylates, dienes, hydrocarbon radicals having from 1 to 20 carbon atoms, fluorinated hydrocarbon radicals (e.g., $—C_6F_5$ (pentafluorophenyl)), fluorinated alkylcarboxylates (e.g., $CF_3C(O)O^-$), hydrides and halogen ions and combinations thereof. Other examples of X ligands include alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like. In one embodiment, two or more X's form a part of a fused ring or ring system.

In another aspect of the invention, the metallocene catalyst component includes those of formula (XII) where $Cp^A$ and $Cp^B$ are bridged to each other by at least one bridging group, (A), such that the structure is represented by formula (XIII):

$Cp^A(A)Cp^B MX_n$ (XIII)

These bridged compounds represented by formula (XIII) are known as "bridged metallocenes". $Cp^A$, $Cp^B$, M, X and n in structure (XIII) are as defined above for formula (XII); and wherein each Cp ligand is chemically bonded to M, and (A) is chemically bonded to each Cp. Non-limiting examples of bridging group (A) include divalent hydrocarbon groups containing at least one Group 13 to 16 atom, such as but not limited to at least one of a carbon, oxygen, nitrogen, silicon, aluminum, boron, germanium and tin atom and combinations thereof. The bridging group (A) may also contain substituent groups R as defined above (for formula (XII)). More particular non-limiting examples of bridging group (A) are represented by $C_1$ to $C_6$ alkylenes, substituted $C_1$ to $C_6$ alkylenes, oxygen, sulfur, $R'_2C=$, $R'_2Si=$, $-Si(R')_2Si(R'_2)-$, $R'_2Ge=$, $R'P=$ (wherein "=" represents two chemical bonds), where R' is independently selected from hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. In one embodiment, the bridged metallocene catalyst component of formula (XIII) has two or more bridging groups (A).

Other non-limiting examples of bridging group (A) include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom; dimethylsilyl, diethylsilyl, dimethylgermyl and diethylgermyl.

In another embodiment, bridging group (A) may also be cyclic, comprising, for example 4 to 10, 5 to 7 ring members in a more particular embodiment. The ring members may be selected from the elements mentioned above, from one or more of B, C, Si, Ge, N and O in a particular embodiment. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in particular, Si and Ge. The bonding arrangement between the ring and the Cp groups may be either cis-, trans-, or a combination.

The cyclic bridging groups (A) may be saturated or unsaturated and/or carry one or more substituents and/or be fused to one or more other ring structures. If present, the one or more substituents are preferably selected from hydrocarbyl (e.g., alkyl such as methyl) and halogen (e.g., F, Cl). The one or more Cp groups which the above cyclic bridging moieties may optionally be fused to may be saturated or unsaturated and are selected from those having 4 to 10, more particularly 5, 6 or 7 ring members (selected from C, N, O and S in a particular embodiment) such as, for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

The ligands $Cp^A$ and $Cp^B$ of formulae (XII) and (XIII) are different from each other in one embodiment, and the same in another embodiment.

In yet another aspect of the invention, the metallocene catalyst components include bridged mono-ligand metallocene compounds (e.g., mono cyclopentadienyl catalyst components). In this embodiment, the at least one metallocene catalyst component is a bridged "half-sandwich" metallocene represented by the formula (XIV):

$$Cp^A(A)QMX_n \qquad (XIV)$$

wherein $Cp^A$ is defined above and is bound to M; (A) is a bridging group bonded to Q and $Cp^A$; and wherein an atom from the Q group is bonded to M; and n is an integer 0, 1 or 2. In formula (XIV) above, $Cp^A$, (A) and Q may form a fused ring system. The X groups and n of formula (XIV) are as defined above in formula (XII). In one embodiment, $Cp^A$ is selected from the group consisting of cyclopentadienyl, indenyl, tetrahydroindenyl, fluorenyl, substituted versions thereof, and combinations thereof.

In formula (XIV), Q is a heteroatom-containing ligand in which the bonding atom (the atom that is bonded with the metal M) is selected from Group 15 atoms and Group 16 atoms in one embodiment, and selected from nitrogen, phosphorus, oxygen or sulfur atom in a more particular embodiment, and nitrogen and oxygen in yet a more particular embodiment. Non-limiting examples of Q groups include alkylamines, arylamines, mercapto compounds, ethoxy compounds, carboxylates (e.g., pivalate), carbamates, azenyl, azulene, pentalene, phosphoyl, phosphinimine, pyrrolyl, pyrozolyl, carbazolyl, borabenzene other compounds comprising Group 15 and Group 16 atoms capable of bonding with M.

In yet another aspect of the invention, the at least one metallocene catalyst component is an unbridged "half sandwich" metallocene represented by the formula (XVa):

$$Cp^AMQ_qX_n \qquad (XVa)$$

wherein $Cp^A$ is defined as for the Cp groups in (XVa) and is a ligand that is bonded to M; each Q is independently bonded to M; X is a leaving group as described above in (XII); n ranges from 0 to 3, and is 0 or 3 in one embodiment; q ranges from 0 to 3, and is 0 or 3 in one embodiment. In one embodiment, $Cp^A$ is selected from the group consisting of cyclopentadienyl, indenyl, tetrahydroindenyl, fluorenyl, substituted version thereof, and combinations thereof.

In formula (XVa), Q is selected from $ROO^-$, $RO^-$, $R(O)-$, $-NR-$, $-CR_2-$, $-S-$, $-NR_2$, $-CR_3$, $-SR$, $-SiR_3$, $-PR_2$, $-H$, and substituted and unsubstituted aryl groups, wherein R is selected from $C_1$ to $C_6$ alkyls, $C_6$ to $C_{12}$ aryls, $C_1$ to $C_6$ alkylamines, $C_6$ to $C_{12}$ alkylarylamines, $C_1$ to $C_6$ alkoxys, $C_6$ to $C_{12}$ aryloxys, and the like. Non-limiting examples of Q include $C_1$ to $C_{12}$ carbamates, $C_1$ to $C_{12}$ carboxylates (e.g., pivalate), $C_2$ to $C_{20}$ allyls, and $C_2$ to $C_{20}$ heteroallyl moieties.

Described another way, the "half sandwich" metallocenes above can be described as in formula (XVb), such as described in, for example, U.S. Pat. No. 6,069,213:

$$Cp^AM(Q_2GZ)X_n \text{ or} \qquad (XVb)$$
$$-T(Cp^AM(Q_2GZ)X_n)_m-$$

wherein M, $Cp^A$, X and n are as defined above;

$Q_2GZ$ forms a polydentate ligand unit (e.g., pivalate), wherein at least one of the Q groups form a bond with M, and is defined such that each Q is independently selected from $-O-$, $-NR-$, $-CR_2-$ and $-S-$; G is either carbon or sulfur; and Z is selected from R, $-OR$, $-NR_2$, —CR$_3$, —SR, —SiR$_3$, —PR$_2$, and hydride, providing that when Q is —NR—, then Z is selected from —OR, —NR$_2$, —SR, —SiR$_3$, —PR$_2$; wherein each R is independently selected from C$_1$ to C$_{10}$ heteroatom containing groups, C$_1$ to C$_{10}$ alkyls, C$_6$ to C$_{12}$ aryls, C$_6$ to C$_{12}$ alkylaryls, C$_1$ to C$_{10}$ alkoxys, and C$_6$ to C$_{12}$ aryloxys;

n is 1 or 2 in a particular embodiment;

T is a bridging group selected from C$_1$ to C$_{10}$ alkylenes, C$_6$ to C$_{12}$ arylenes and C$_1$ to C$_{10}$ heteroatom containing groups, and C$_6$ to C$_{12}$ heterocyclic groups; wherein each T group bridges adjacent "Cp$^A$M(Q$_2$GZ)X$_n$" groups, and is chemically bonded to the Cp$^A$ groups.

m is an integer from 1 to 7; m is an integer from 2 to 6 in a more particular embodiment.

In yet another aspect of the invention, the at least one metallocene catalyst component is a bridged heterocyclic ligand complex represented by the formula (XVI):

$$((ZD)(A)_t(YB))_qMX_n \quad (XVI)$$

wherein M is defined above; YB and ZD are bonded to M and each X is, if present, defined above for (XII);

one or more of D and B are heteroatoms selected from Group 13 to Group 16 elements in one embodiment; and selected from nitrogen, oxygen, sulfur, phosphorus and boron in a more particular embodiment;

Y comprises B, wherein Y is a heterocyclic ring in one embodiment, wherein Y comprises from 2 to 50 non-hydrogen atoms, from 2 to 30 carbon atoms in one embodiment;

Z comprises D, where Z comprises 1 to 50 non-hydrogen atoms, 1 to 50 carbon atoms in one embodiment; Z is a cyclic group containing 3 to 50 atoms in a more particular embodiment, 3 to 30 carbon atoms in yet a more particular embodiment;

t is 0 or 1; when t is 1, (A), as defined in formula (XIII), is a bridging group joined to at least one of ZD or YB in one embodiment;

q is 1 or 2; n is an integer from 0 to 4; all other groups in formula (XVI) are as defined above.

In one embodiment, ZD and YB of formula (XVI) are selected from oxygen, sulfur, phosphorous and nitrogen heterocyclic derivatives of cyclopentadienyl, indenyl, tetrahydroindenyl, fluorenyl, substituted derivatives of each, and combinations thereof.

In another aspect of the invention, the at least one metallocene catalyst component can be described more particularly as embodiments of the formulae (XII)–(XVI), as shown below in structures (XVIIa), (XVIIb), (XVIIc) and (XVIId):

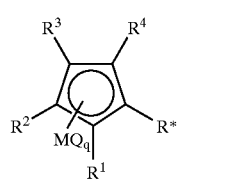
(XVIIa-i)

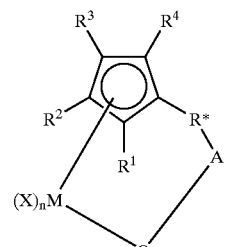
(XVIIa-ii)

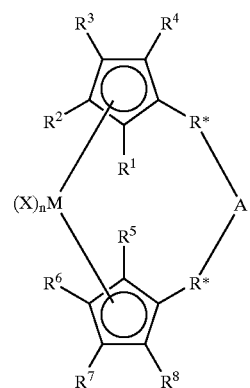
(XVIIb)

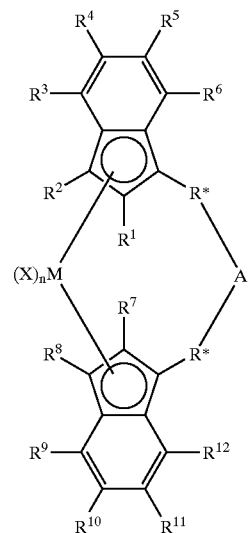
(XVIIc)

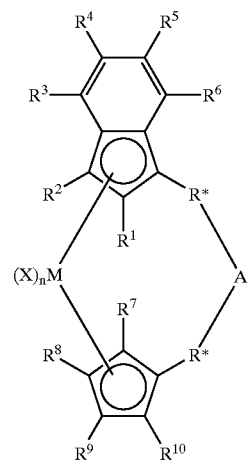
(XVIId)

wherein in structures (XVIIa) to (XVIId) M is selected from Group 3 to Group 12 atoms, and selected from Group 3 to Group 10 atoms in a more particular embodiment, and selected from Group 3 to Group 6 atoms in yet a more particular embodiment, and selected from Group 4 atoms in yet a more particular embodiment, and selected from Zr and Hf in yet a more particular embodiment;

wherein Q in (XVIIa-i) and (XVIIa-ii) is selected from halogen ions, alkyls, alkylenes, aryls, arylenes, alkoxys, aryloxys, amines, alkylamines, phosphines, alkylphosphines, substituted alkyls, substituted aryls, substituted alkoxys, substituted aryloxys, substituted amines, substituted alkylamines, substituted phosphines, substituted alkylphosphines, carbamates, heteroallyls, carboxylates (non-limiting examples of suitable carbamates and carboxylates include trimethylacetate, trimethylacetate, methylacetate, p-toluate, benzoate, diethylcarbamate, and dimethylcarbamate), fluorinated alkyls, fluorinated aryls, and fluorinated alkylcarboxylates;

q is an integer ranging from 1 to 3;

wherein each R* is independently: selected from hydrocarbyls and heteroatom-containing hydrocarbyls in one embodiment; and selected from alkylenes, substituted alkylenes and heteroatom-containing hydrocarbyls in another embodiment; and selected from $C_1$ to $C_{12}$ alkylenes, $C_1$ to $C_{12}$ substituted alkylenes, and $C_1$ to $C_{12}$ heteroatom-containing hydrocarbons in a more particular embodiment; and selected from $C_1$ to $C_4$ alkylenes in yet a more particular embodiment; and wherein both R* groups are identical in another embodiment in structures (XVb–d);

A is as described above for (A) in structure (XIII), and more particularly, selected from —O—, —S—, —SO$_2$—, —NR—, =SiR$_2$, =GeR$_2$, =SnR$_2$, —R$_2$SiSiR$_2$—, RP=, $C_1$ to $C_{12}$ alkylenes, substituted $C_1$ to $C_{12}$ alkylenes, divalent $C_4$ to $C_{12}$ cyclic hydrocarbons and substituted and unsubstituted aryl groups in one embodiment; and selected from $C_5$ to $C_8$ cyclic hydrocarbons, —CH$_2$CH$_2$—, =CR$_2$ and =SiR$_2$ in a more particular embodiment; wherein and R is selected from alkyls, cycloalkyls, aryls, alkoxys, fluoroalkyls and heteroatom-containing hydrocarbons in one embodiment; and R is selected from $C_1$ to $C_6$ alkyls, substituted phenyls, phenyl, and $C_1$ to $C_6$ alkoxys in a more particular embodiment; and R is selected from methoxy, methyl, phenoxy, and phenyl in yet a more particular embodiment;

wherein A may be absent in yet another embodiment, in which case each R* is defined as for $R^1$–$R^{10}$;

each X is independently selected from any leaving group in one embodiment wherein the atom bonded to M is selected from hydride, carbon atoms and heteroatoms (e.g., oxygen, nitrogen, sulfur, phosphorous, and halogens); selected from hydrogen radicals, halogen ions (fluoride, chloride, bromide, iodide), $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof in a more particular embodiment; selected from hydrogen radical, fluoride, chloride, bromide, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in yet a more particular embodiment; and selected from hydrogen radical, fluoride, chloride, methyl, phenyl, phenoxy, benzoxy, tosyl, fluoromethyls and fluorophenyls in yet a more particular embodiment; other non-limiting examples of desirable X groups include trimethylacetate, trimethylacetate, methylacetate, p-toluate, benzoate, diethylcarbamate, and dimethylcarbamate; alkyl sulfonates such as mesylate, triflate, nonaflate, $C_6$–$C_{10}$ arylsulfonates such as toyslate, benzosulfonate, $C_1$–$C_{10}$ alkylcarbonates such as acetate, formate, oxalate and 1,3-dicarbonylate such as acetylacetonate and fluorinated 1,3-dicarbonylate;

n is an integer from 0 to 4, and from 1 to 3 in another embodiment, and from 1 to 2 in yet another embodiment; and $R^1$ through $R^{10}$ are independently: selected from hydrogen radical, halogen radicals, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof in one embodiment; selected from hydrogen radical, fluorine radical, chlorine radical, bromine radical, $C_1$ to $C_6$ alkyls, $C_2$ to $C_6$ alkenyls, $C_7$ to $C_{18}$ alkylaryls, $C_1$ to $C_6$ fluoroalkyls, $C_2$ to $C_6$ fluoroalkenyls, $C_7$ to $C_{18}$ fluoroalkylaryls in a more particular embodiment; and hydrogen radical, fluorine radical, chlorine radical, methyl, ethyl, propyl, isopropyl, butyl, isobutyl, tertiary butyl, hexyl, phenyl, 2,6-dimethylpheyl, and 4-tertiarybutylpheyl groups in yet a more particular embodiment; wherein adjacent R groups may form a ring, either saturated, partially saturated, or completely saturated.

The structure of the metallocene catalyst component represented by (XVIIa) may take on many forms such as disclosed in, for example, U.S. Pat. Nos. 5,026,798, 5,703, 187, and 5,747,406, including a dimer or oligomeric structure, such as disclosed in, for example, U.S. Pat. Nos. 5,026,798 and 6,069,213.

In a particular embodiment of the metallocene represented in (XVIId), $R^1$ and $R^2$ form a conjugated 6-membered carbon ring system that may or may not be substituted.

Non-limiting examples of metallocene catalyst components consistent with the description herein include:

cyclopentadienylzirconium $X_n$,
indenylzirconium $X_p$,
(1-methylindenyl)zirconium $X_n$,
(2-methylindenyl)zirconium $X_n$,
(1-propylindenyl)zirconium $X_n$,
(2-propylindenyl)zirconium $X_n$,
(1-butylindenyl)zirconium $X_n$,
(2-butylindenyl)zirconium $X_n$,
(methylcyclopentadienyl)zirconium $X_n$,
tetrahydroindenylzirconium $X_n$,
(pentamethylcyclopentadienyl)zirconium $X_n$,
cyclopentadienylzirconium $X_n$,
pentamethylcyclopentadienyltitanium $X_n$,
tetramethylcyclopentyltitanium $X_n$,
1,2,4-trimethylcyclopentadienylzirconium $X_n$,
dimethylsilyl(1,2,3,4-tetramethylcyclopentadienyl)(cyclopentadienyl)zirconium $X_n$,
dimethylsilyl(1,2,3,4-tetramethylcyclopentadienyl)(1,2,3-trimethylcyclopentadienyl)zirconium $X_n$,
dimethylsilyl(1,2,3,4-tetramethylcyclopentadienyl)(1,2-dimethylcyclopentadienyl)zirconium $X_n$,
dimethylsilyl(1,2,3,4-tetramethyl-cyclopentadienyl)(2-methylcyclopentadienyl)zirconium $X_n$, dimethylsilyl(cyclopentadienyl)(indenyl)zirconium $X_n$,
dimethylsilyl(2-methylindenyl)(fluorenyl)zirconium $X_n$,
diphenylsilyl(1,2,3,4-tetramethyl-cyclopentadienyl)(3-propylcyclopentadienyl)zirconium $X_n$,
dimethylsilyl (1,2,3,4-tetramethylcyclopentadienyl) (3-t-butylcyclopentadienyl)zirconium $X_n$,
dimethylgermyl(1,2-dimethylcyclopentadienyl)(3-isopropylcyclopentadienyl)zirconium $X_n$,
dimethylsilyl(1,2,3,4-tetramethyl-cyclopentadienyl)(3-methylcyclopentadienyl) zirconium $X_n$,
diphenylmethylidene(cyclopentadienyl)(9-fluorenyl) zirconium $X_n$,
diphenylmethylidene(cyclopentadienyl)(indenyl)zirconium $X_n$,
iso-propylidenebis(cyclopentadienyl)zirconium $X_n$,
iso-propylidene(cyclopentadienyl)(9-fluorenyl)zirconium $X_n$,
iso-propylidene(3-methylcyclopentadienyl)(9-fluorenyl) zirconium $X_n$,
ethylenebis(9-fluorenyl)zirconium $X_n$,
meso-ethylenebis(1-indenyl)zirconium $X_n$,
ethylenebis(1-indenyl)zirconium $X_n$,
ethylenebis(2-methyl-1-indenyl)zirconium $X_n$,
ethylenebis(2-methyl-4,5,6,7-tetrahydro-1-indenyl) zirconium $X_n$,
ethylenebis(2-propyl-4,5,6,7-tetrahydro-1-indenyl) zirconium $X_n$,
ethylenebis(2-isopropyl-4,5,6,7-tetrahydro-1-indenyl) zirconium $X_n$,
ethylenebis(2-butyl-4,5,6,7-tetrahydro-1-indenyl)zirconium $X_n$,
ethylenebis(2-isobutyl-4,5,6,7-tetrahydro-1-indenyl) zirconium $X_n$,
dimethylsilyl(4,5,6,7-tetrahydro-1-indenyl)zirconium $X_n$,
diphenyl(4,5,6,7-tetrahydro-1-indenyl)zirconium $X_n$,
ethylenebis(4,5,6,7-tetrahydro-1-indenyl)zirconium $X_n$,
dimethylsilylbis(cyclopentadienyl)zirconium $X_n$,
dimethylsilylbis(9-fluorenyl)zirconium $X_n$,
dimethylsilylbis(1-indenyl)zirconium $X_n$,
dimethylsilylbis(2-methylindenyl)zirconium $X_n$,
dimethylsilylbis(2-propylindenyl)zirconium $X_n$,
dimethylsilylbis(2-butylindenyl)zirconium $X_n$,
diphenylsilylbis(2-methylindenyl)zirconium $X_n$,
diphenylsilylbis(2-propylindenyl)zirconium $X_n$,
diphenylsilylbis(2-butylindenyl)zirconium $X_n$,
dimethylgermylbis(2-methylindenyl)zirconium $X_n$,
dimethylsilylbis(tetrahydroindenyl)zirconium $X_n$,
dimethylsilylbis(tetramethylcyclopentadienyl)zirconium $X_n$,
dimethylsilyl(cyclopentadienyl)(9-fluorenyl)zirconium $X_n$,
diphenylsilyl(cyclopentadienyl)(9-fluorenyl)zirconium $X_n$,
diphenylsilylbis(indenyl)zirconium $X_n$,
cyclotrimethylenesilyl(tetramethylcyclopentadienyl) (cyclopentadienyl)zirconium $X_n$,
cyclotetramethylenesilyl(tetramethylcyclopentadienyl) (cyclopentadienyl) zirconium $X_n$,
cyclotrimethylenesilyl(tetramethylcyclopentadienyl)(2-methylindenyl)zirconium $X_n$,
cyclotrimethylenesilyl(tetramethylcyclopentadienyl)(3-methylcyclopentadienyl)zirconium $X_n$,
cyclotrimethylenesilylbis(2-methylindenyl)zirconium $X_n$,
cyclotrimethylenesilyl(tetramethylcyclopentadienyl)(2,3,5-trimethylcyclopentadienyl)zirconium $X_n$,
cyclotrimethylenesilylbis(tetramethylcyclopentadienyl) zirconium $X_n$,
dimethylsilyl(tetramethylcyclopentadieneyl)(N-tert-butylamido)titanium $X_n$,
bis(cyclopentadienyl)chromium $X_n$,
bis(cyclopentadienyl)zirconium $X_n$,
bis(n-butylcyclopentadienyl)zirconium $X_n$,
bis(n-dodecylcylcyclopentadienyl)zirconium $X_n$,
bis(ethylcyclopentadienyl)zirconium $X_n$,
bis(iso-butylcyclopentadienyl)zirconium $X_n$,
bis(iso-propylcyclopentadienyl)zirconium $X_n$,
bis(methylcyclopentadienyl)zirconium $X_n$,
bis(n-oxtylcyclopentadienyl)zirconium $X_n$,
bis(n-pentylcyclopentadienyl)zirconium $X_n$,
bis(n-propylcyclopentadienyl)zirconium $X_n$,
bis(trimethylsilylcyclopentadienyl)zirconium $X_n$,
bis(1,3-bis(trimethylsilyl)cyclopentadienyl)zirconium $X_n$,
bis(1-ethyl-2-methylcyclopentadienyl)zirconium $X_n$,
bis(1-ethyl-3-methylcyclopentadienyl)zirconium $X_n$,
bis(pentamethylcyclopentadienyl)zirconium $X_n$,
bis(pentamethylcyclopentadienyl)zirconium $X_n$,
bis(1-propyl-3-methylcyclopentadienyl)zirconium $X_n$,
bis(1-n-butyl-3-methylcyclopentadienyl)zirconium $X_n$,
bis(1-isobutyl-3-methylcyclopentadienyl)zirconium $X_n$,
bis(1-propyl-3-butylcyclopentadienyl)zirconium $X_n$,
bis(1,3-n-butylcyclopentadienyl)zirconium $X_n$,
bis(4,7-dimethylindenyl)zirconium $X_n$,
bis(indenyl)zirconium $X_n$,
bis(2-methylindenyl)zirconium $X_n$,
cyclopentadienylindenylzirconium $X_n$,
bis(n-propylcyclopentadienyl)hafnium $X_n$,
bis(n-butylcyclopentadienyl)hafnium $X_n$,
bis(n-pentylcyclopentadienyl)hafnium $X_n$,
(n-propyl cyclopentadienyl)(n-butyl cyclopentadienyl) hafnium $X_n$,
bis[(2-trimethylsilylethyl)cyclopentadienyl]hafnium $X_n$,
bis(trimethylsilyl cyclopentadienyl)hafnium $X_n$,
bis(2-n-propylindenyl)hafnium $X_n$,
bis(2-n-butylindenyl)hafnium $X_n$,
dimethylsilylbis(n-propylcyclopentadienyl)hafnium $X_n$,
dimethylsilylbis(n-butylcyclopentadienyl)hafnium $X_n$,
bis(9-n-propylfluorenyl)hafnium $X_n$,
bis(9-n-butylfluorenyl)hafnium $X_n$,
(9-n-propylfluorenyl)(2-n-propylindenyl)hafnium $X_n$,
bis(1-n-propyl-2-methylcyclopentadienyl)hafnium $X_n$,
(n-propylcyclopentadienyl)(1-n-propyl-3-n-butylcyclopentadienyl)hafnium $X_n$,
dimethylsilyl(tetramethylcyclopentadienyl) (cyclopropylamido)titanium $X_n$,
dimethylsilyl(tetramethylcyclopentadienyl) (cyclobutylamido)titanium $X_n$,
dimethylsilyl(tetramethylcyclopentadienyl) (cyclopentylamido)titanium $X_n$,
dimethylsilyl(tetramethylcyclopentadienyl) (cyclohexylamido)titanium $X_n$,
dimethylsilyl(tetramethylcyclopentadienyl) (cycloheptylamido)titanium $X_n$,
dimethylsilyl(tetramethylcyclopentadienyl) (cyclooctylamido)titanium $X_n$,
dimethylsilyl(tetramethylcyclopentadienyl) (cyclononylamido)titanium $X_n$,
dimethylsilyl(tetramethylcyclopentadienyl) (cyclodecylamido)titanium $X_n$,
dimethylsilyl(tetramethylcyclopentadienyl) (cycloundecylamido)titanium $X_n$,
dimethylsilyl(tetramethylcyclopentadienyl) (cyclododecylamido)titanium $X_n$,
dimethylsilyl(tetramethylcyclopentadienyl)(sec-butylamido)titanium $X_n$,
dimethylsilyl(tetramethylcyclopentadienyl)(n-octylamido) titanium $X_n$, dimethylsilyl(tetramethylcyclopentadienyl)(n-decylamido)titanium $X_n$,
dimethylsilyl(tetramethylcyclopentadienyl)(n-octadecylamido)titanium $X_n$,
methylphenylsilyl(tetramethylcyclopentadienyl)(cyclopropylamido)titanium $X_n$,
methylphenylsilyl(tetramethylcyclopentadienyl)(cyclobutylamido)titanium $X_n$,
methylphenylsilyl(tetramethylcyclopentadienyl)(cyclopentylamido)titanium $X_n$,
methylphenylsilyl(tetramethylcyclopentadienyl)(cyclohexylamido)titanium $X_n$,
methylphenylsilyl(tetramethylcyclopentadienyl)(cycloheptylamido)titanium $X_n$,
methylphenylsilyl(tetramethylcyclopentadienyl)(cyclooctylamido)titanium $X_n$,
methylphenylsilyl(tetramethylcyclopentadienyl)(cyclononylamido)titanium $X_n$,
methylphenylsilyl(tetramethylcyclopentadienyl)(cyclodecylamido)titanium $X_n$,
methylphenylsilyl(tetramethylcyclopentadienyl)(cycloundecylamido)titanium $X_n$,
methylphenylsilyl(tetramethylcyclopentadienyl)(cyclododecylamido)titanium $X_n$,
methylphenylsilyl(tetramethylcyclopentadienyl)(sec-butylamido)titanium $X_n$,
methylphenylsilyl(tetramethylcyclopentadienyl)(n-octylamido)titanium $X_n$,
methylphenylsilyl(tetramethylcyclopentadienyl)(n-decylamido)titanium $X_n$,
methylphenylsilyl(tetramethylcyclopentadienyl)(n-octadecylamido)titanium $X_n$,
diphenylsilyl(tetramethylcyclopentadienyl)(cyclopropylamido)titanium $X_n$,
diphenylsilyl(tetramethylcyclopentadienyl)(cyclobutylamido)titanium $X_n$,
diphenylsilyl(tetramethylcyclopentadienyl)(cyclopentylamido)titanium $X_n$,
diphenylsilyl(tetramethylcyclopentadienyl)(cyclohexylamido)titanium $X_n$,
diphenylsilyl(tetramethylcyclopentadienyl)(cycloheptylamido)titanium $X_n$,
diphenylsilyl(tetramethylcyclopentadienyl)(cyclooctylamido)titanium $X_n$,
diphenylsilyl(tetramethylcyclopentadienyl)(cyclononylamido)titanium $X_n$,
diphenylsilyl(tetramethylcyclopentadienyl)(cyclodecylamido)titanium $X_n$,
diphenylsilyl(tetramethylcyclopentadienyl)(cycloundecylamido)titanium $X_n$,
diphenylsilyl(tetramethylcyclopentadienyl)(cyclododecylamido)titanium $X_n$,
diphenylsilyl(tetramethylcyclopentadienyl)(sec-butylamido)titanium $X_n$,
diphenylsilyl(tetramethylcyclopentadienyl)(n-octylamido)titanium $X_n$,
diphenylsilyl(tetramethylcyclopentadienyl)(n-decylamido)titanium $X_n$,
diphenylsilyl(tetramethylcyclopentadienyl)(n-octadecylamido)titanium $X_n$, and derivatives thereof; wherein n=0, 1, 2 or 3.

By "derivatives thereof", it is meant replacement of the metal (Cr, Zr, Ti or Hf) with an atom selected from Cr, Zr, Hf and Ti; and/or replacement of the "X" group with any of $C_1$ to $C_5$ alkyls, $C_6$ aryls, $C_6$ to $C_{10}$ alkylaryls, fluorine, chlorine, or bromine.

It is contemplated that the metallocene catalysts components described above include their structural or optical or enantiomeric isomers (racemic mixture), and may be a pure enantiomer in one embodiment.

As used herein, a single, bridged, asymmetrically substituted metallocene catalyst component having a racemic and/or meso isomer does not, itself, constitute at least two different bridged, metallocene catalyst components.

The "metallocene catalyst component" useful in the present invention may comprise any combination of any "embodiment" described herein.

Phenoxide Catalyst Component

The at least one catalyst component useful in the catalyst system of the present invention may also comprise so called "phenoxide catalyst components" which include one or more phenoxide catalyst compounds represented by the following formulae (XVIIIa) and (XVIIIb):

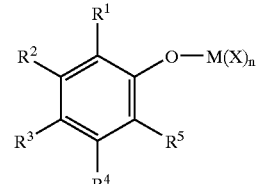
(XVIIIa)

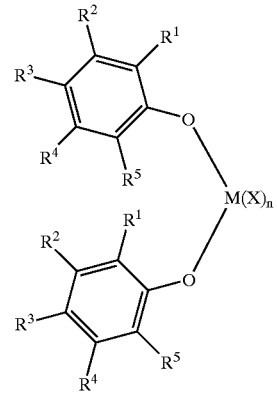
(XVIIIb)

wherein $R^1$ is selected from hydride and $C_4$ to $C_{50}$ hydrocarbons in one embodiment; and selected from a tertiary alkyls in a more particular embodiment; and selected from $C_4$ to $C_{20}$ alkyls in yet a more particular embodiment; and selected from a $C_4$ to $C_{20}$ tertiary alkyls in yet a more particular embodiment;

at least one of $R^2$ to $R^5$ is a group containing a heteroatom, wherein $R^2$ to $R^5$ are independently selected from hydride, $C_1$ to $C_{100}$ hydrocarbon groups and $C_1$ to $C_{100}$ heteroatom containing groups; and selected from $C_4$ to $C_{20}$ alkyls in a more particular embodiment and $C_4$ to $C_{20}$ heteroatom alkyls in a more particular embodiment; and selected from hydride, butyl, isobutyl, pentyl hexyl, heptyl, isohexyl, octyl, isooctyl, decyl, nonyl, and dodecyl in yet a more particular embodiment; wherein any of $R^2$ to $R^5$ also may or may not be bound to M;

M is a Group 3 to Group 10 atom in one embodiment; selected from Group 4 atoms in a more particular embodiment; and selected from Ti, Zr or Hf in yet a more particular embodiment;

n is an integer from 0 to 6; n ranges from 2 to 4 in a more particular embodiment; and X is selected from alkyls, halogen ions, benzyl, amides, carboxylates, carbamates, thiolates, hydride and alkoxides in one embodiment, or a bond to an R group containing a heteroatom which may be any of $R^1$ to $R^5$. A heteroatom containing group may be any heteroatom or a heteroatom bound to carbon silica or another heteroatom. Desirable heteroatoms include boron, aluminum, silicon, nitrogen, phosphorus, arsenic, tin, lead, antimony, oxygen, selenium, tellurium; and nitrogen, oxygen, phosphorus, and sulfur in a more particular embodiment; and oxygen and nitrogen in yet a more particular embodiment. The heteroatom itself may be directly bound to the phenoxide ring or it may be bound to another atom or atoms that are bound to the phenoxide ring. The heteroatom containing group may contain one or more of the same or different heteroatoms. Non-limiting examples of heteroatom groups include imines, amines, oxides, phosphines, ethers, ketenes, oxoazolines heterocyclics, oxazolines, thioethers, and the like. Any two adjacent R groups may form a ring structure, a 5 or 6 membered ring in one embodiment. Likewise the R groups may form multi-ring structures. In one embodiment any two or more R groups do not form a 5 membered ring.

In one embodiment, X is a bond to any of $R^2$ to $R^5$ and the R group that X is bound to is a heteroatom containing group.

Non-limiting examples of the phenoxide catalyst component consistent with the description herein include:

bis(N-methyl-3,5-di-t-butylsalicylimino)zirconium dibenzyl;
bis(N-ethyl-3,5-di-t-butylsalicylimino)zirconium dibenzyl;
bis(N-iso-propyl-3,5-di-t-butylsalicylimino)zirconium dibenzyl;
bis(N-t-butyl-3,5-di-t-butylsalicylimino)zirconium dibenzyl;
bis(N-benzyl-3,5-di-t-butylsalicylimino)zirconium dibenzyl;
bis(N-hexyl-3,5-di-t-butylsalicylimino)zirconium dibenzyl;
bis(N-phenyl-3,5-di-t-butylsalicylimino)zirconium dibenzyl;
bis(N-methyl-3,5-di-t-butylsalicylimino)zirconium dibenzyl;
bis(N-benzyl-3,5-di-t-butylsalicylimino)zirconium dichloride;
bis(N-benzyl-3,5-di-t-butylsalicylimino)zirconium dipivalate;
bis(N-benzyl-3,5-di-t-butylsalicylimino)titanium dipivalate;
bis(N-benzyl-3,5-di-t-butylsalicylimino)zirconium di(bis(dimethylamide));
bis(N-iso-propyl-3,5-di-t-amylsalicylimino)zirconium dibenzyl;
bis(N-iso-propyl-3,5-di-t-octylsalicylimino)zirconium dibenzyl;
bis(N-iso-propyl-3,5-di-(1',1'-dimethylbenzyl)salicylimino)zirconium dibenzyl;
bis(N-iso-propyl-3,5-di-(1',1'-dimethylbenzyl)salicylimino)titanium dibenzyl;
bis(N-iso-propyl-3,5-di-(1',1'-dimethylbenzyl)salicylimino)hafnium dibenzyl;
bis(N-iso-butyl-3,5-di-(1',1'-dimethylbenzyl)salicylimino)zirconium dibenzyl;
bis(N-iso-butyl-3,5-di-(1',1'-dimethylbenzyl)salicylimino)zirconium dichloride;
bis(N-hexyl-3,5-di-(1',1'-dimethylbenzyl)salicylimino)zirconium dibenzyl;
bis(N-phenyl-3,5-di-(1',1'-dimethylbenzyl)salicylimino)zirconium dibenzyl;
bis(N-iso-propyl-3,5-di-(1'-methylcyclohexyl)salicylimino)zirconium dibenzyl;
bis(N-benzyl-3-t-butylsalicylimino)zirconium dibenzyl;
bis(N-benzyl-3-triphenylmethylsalicylimino)zirconium dibenzyl;
bis(N-iso-propyl-3,5-di-trimethylsilylsalicylimino)zirconium dibenzyl;
bis(N-iso-propyl-3-(phenyl)salicylimino)zirconium dibenzyl;
bis(N-benzyl-3-(2',6'-di-iso-propylphenyl)salicylimino)zirconium dibenzyl;
bis(N-benzyl-3-(2',6'-di-phenylphenyl)salicylimino)zirconium dibenzyl;
bis(N-benzyl-3-t-butyl-5-methoxysalicylimino)zirconium dibenzyl;
bis(2-(2H-benzotriazol-2-yl)-4,6-di-t-amylphenoxide)zirconium dibenzyl;
bis(2-(2H-benzotriazol-2-yl)-4,6-di-t-amylphenoxide)zirconium dichloride;
bis(2-(2H-benzotriazol-2-yl)-4,6-di-t-amylphenoxide)zirconium di(bis(dimethylamide));
bis(2-(2H-benzotriazol-2-yl)-4,6-di-(1',1'-dimethylbenzyl)phenoxide)zirconium dibenzyl;
bis(2-(2H-benzotriazol-2-yl)-4,6-di-t-amylphenoxide)titanium dibenzyl;
bis(2-(2H-benzotriazol-2-yl)-4,6-di-(1',1'-dimethylbenzyl)phenoxide)titanium dibenzyl;
bis(2-(2H-benzotriazol-2-yl)-4,6-di-(1',1'-dimethylbenzyl)phenoxide)titanium dichloride;
bis(2-(2H-benzotriazol-2-yl)-4,6-di-(1',1'-dimethylbenzyl)phenoxide)hafnium dibenzyl;
(N-phenyl-3,5-di-(1',1'-dimethylbenzyl)salicylimino)zirconium tribenzyl;
(N-(2',6'-di-iso-propylphenyl)-3,5-di-(1',1'-dimethylbenzyl)salicylimino)zirconium tribenzyl;
(N-(2',6'-di-iso-propylphenyl)-3,5-di-(1',1'-dimethylbenzyl)salicylimino)titanium tribenzyl; and (N-(2',6'-di-iso-propylphenyl)-3,5-di-(1',1'-dimethylbenzyl)salicylimino)zirconium trichloride, and the like.

The "phenoxide catalyst component" useful in the present invention may comprise any combination of any "embodiment" described herein.

Supports, Carriers and General Supporting Techniques

The activator complexes of the invention and/or the polymerization catalyst compound may be combined with one or more support materials or carriers, using one of the support methods known in the art or as described below. For example, in one embodiment the activator complex is in a supported form, for example deposited on, contacted with, vaporized with, bonded to, or incorporated within, adsorbed or absorbed in, or on, a support or carrier. In another embodiment, the activator and a catalyst compound may be deposited on, contacted with, vaporized with, bonded to, or incorporated within, adsorbed or absorbed in, or on, a support or carrier.

The terms "support" or "carrier", for purposes of this patent specification, are used interchangeably and are any support material, preferably a porous support material, including inorganic or organic support materials. Non-limiting examples of inorganic support materials include inorganic oxides and inorganic chlorides. Other carriers include resinous support materials such as polystyrene, functionalized or crosslinked organic supports, such as polystyrene, divinyl benzene, polyolefins, or polymeric compounds, zeolites, talc, clays, or any other organic or inorganic support material and the like, or mixtures thereof.

The preferred carriers are inorganic oxides that include those Group 2, 3, 4, 5, 13 or 14 metal oxides. The preferred supports include silica, alumina, silica-alumina, magnesium chloride, and mixtures thereof. Other useful supports include magnesia, titania, zirconia, montmorillonite (EP-B1 0 511 665), phyllosilicate, and the like. Also, combinations of these support materials may be used, for example, silica-chromium, silica-alumina, silica-titania and the like. Additional support materials may include those porous acrylic polymers described in EP 0 767 184 B1.

It is preferred that the carrier, most preferably an inorganic oxide, has a surface area in the range of from 10 to 700 $m^2/g$, pore volume in the range of from 0.1 to 4.0 cc/g and average particle size in the range of from 5 to 500 μm. More preferably, the surface area of the carrier is in the range of from 50 to 500 $m^2/g$, pore volume of from 0.5 to 3.5 cc/g and average particle size of from 10 to 200 μm. Most preferably the surface area of the carrier is in the range is from 100 to 400 $m^2/g$, pore volume from 0.8 to 3.0 cc/g and average particle size is from 5 to 100 μm. The average pore size of the carrier of the invention typically has pore size in the range of from 10 to 1000 Å, preferably 50 to 500 Å, and most preferably 75 to 350 Å.

In another embodiment, an antistatic agent or surface modifier, that is used in the preparation of the supported catalyst system as described in WO 96/11960 may be used with catalyst systems including the activator compounds of the invention. The catalyst systems of the invention may also be prepared in the presence of an olefin, for example 1-hexene.

In another embodiment, activator and/or catalyst system of the invention may be combined with a carboxylic acid salt of a metal ester, for example aluminum carboxylates such as aluminum mono, di- and tri-stearates, aluminum octoates, oleates and cyclohexylbutyrates, as described in U.S. Pat. Nos. 6,300,436 and 6,306,984.

In another embodiment there is a method for producing a supported metallocene catalyst system, which maybe used to support the activator of the invention which is described below, and is described in WO 96/00245 and WO 96/00243. In this method, the catalyst compound is slurried in a liquid to form a catalyst solution or emulsion. A separate solution is formed containing the activator. The liquid may be any compatible solvent or other liquid capable of forming a solution or the like with the catalyst compounds and/or activator. In the most preferred embodiment the liquid is a cyclic aliphatic or aromatic hydrocarbon, most preferably toluene. The catalyst compound and activator solutions are mixed together heated and added to a heated porous support or a heated porous support is added to the solutions such that the total volume of the metallocene-type catalyst compound solution and the activator solution or the metallocene-type catalyst compound and activator solution is less than four times the pore volume of the porous support, more preferably less than three times, even more preferably less than two times; preferred ranges being from 1.1 times to 3.5 times range and most preferably in the 1.2 to 3 times range.

In one embodiment, a method of forming a supported catalyst system, the amount of liquid, in which the activator of the invention and/or a catalyst compound is present, is in an amount that is less than four times the pore volume of the support material, more preferably less than three times, even more preferably less than two times; preferred ranges being from 1.1 times to 3.5 times range and most preferably in the 1.2 to 3 times range. In an alternative embodiment, the amount of liquid in which the activator is present is from one to less than one times the pore volume of the support material utilized in forming the supported activator.

In a particular embodiment, the carrier is a Group 13 or 14 inorganic oxide support, and particularly, a silicon or aluminum oxide support. This support may be pretreated by any suitable means as by "calcining" at from 100° C. to 1000° C., or between 500° C. and 900° C. in a particular embodiment. The inorganic oxide may also be pretreated by any suitable means by, for example, pretreatment with a silane or organosilane agent, or by treating with a fluoriding agent such as is known in the art. The activators useful in the invention may be supported by combining the support and activator by any suitable means, typically by mixing both in a non-coordinating diluent such as a $C_5$ to $C_{20}$ hydrocarbon, mineral oil, or other mixture thereof. This combining step may be followed by removal of excess activator and/or removal of the diluent. The catalyst component may also be contacted with the support or supported activator by any suitable means. In another embodiment, the support is a polystyrene support, and in particular, an inert polystyrene support that excludes functional groups (e.g., polar groups, carboxyls, hydroxys, etc.) and/or has been pretreated as by contacting with an acid, and separately by a base, in any order, to remove any impurities in the polystyrene.

Polymerization Process

The activators of the invention, catalyst systems and supported catalyst systems utilizing the activators described above are suitable for use in any prepolymerization and/or polymerization process over a wide range of temperatures and pressures. The temperatures may be in the range of from −60° C. to 280° C., preferably from 50° C. to 200° C. In another embodiment the polymerization temperature is above 0° C., above 50° C., above 80° C., above 100° C., above 150° C., or above 200° C. In one embodiment the pressures employed may be in the range from 1 atmosphere to 500 atmospheres or higher.

Polymerization processes include solution, gas phase, slurry phase and a high pressure process or a combination thereof Particularly preferred is a gas phase or slurry phase polymerization of one or more olefin(s) at least one of which is ethylene or propylene.

In one embodiment, the process of the invention is directed toward a solution, high pressure, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, 1-butene, 1-pentene, 4-methyl-1-pentene, 1-hexene, 1-octene and 1-decene.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In another embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process.

In another embodiment of the process of the invention, ethylene or propylene is polymerized with at least two different comonomers, optionally one of which may be a diene, to form a terpolymer.

In one embodiment, the invention is directed to a polymerization process, particularly a gas phase or slurry phase process, for polymerizing propylene alone or with one or more other monomers including ethylene, and/or other olefins having from 4 to 12 carbon atoms.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228.)

The reactor pressure in a gas phase process may vary from 100 psig (690 kPa) to 500 psig (3448 kPa), preferably in the range of from 200 psig (1379 kPa) to 400 psig (2759 kPa), more preferably in the range of from 250 psig (1724 kPa) to 350 psig (2414 kPa).

The reactor temperature in a gas phase process may vary from 30° C. to 120° C., preferably from 60° C. to 115° C., more preferably in the range of from 70° C. to 110° C., and most preferably in the range of from 70° C. to 95° C. In another embodiment, the reactor temperature in a gas phase process is above 60° C.

Other gas phase processes contemplated by the process of the invention include series or multistage polymerization processes. Also gas phase processes contemplated by the invention include those described in U.S. Pat. Nos. 5,627,242, 5,665,818 and 5,677,375; EP-A-0 794 200 EP-B1-0 649 992, EP-A-0 802 202 and EP-B-634 421.

In another embodiment, the reactor utilized in the present invention is capable and the process of the invention is producing greater than 500 lbs of polymer per hour (227 kg/hr) to 200,000 lbs/hr (90,900 kg/hr) or higher of polymer, preferably greater than 1000 lbs/hr (455 kg/hr), more preferably greater than 10,000 lbs/hr (4540 kg/hr), even more preferably greater than 25,000 lbs/hr (11,300 kg/hr), still more preferably greater than 35,000 lbs/hr (15,900 kg/hr), still even more preferably greater than 50,000 lbs/hr (22,700 kg/hr) and most preferably greater than 65,000 lbs/hr (29,000 kg/hr) to greater than 100,000 lbs/hr (45,500 kg/hr).

A slurry polymerization process generally uses pressures in the range of from 1 to 50 atmospheres and even greater and temperatures in the range of 0° C. to 120° C. In another embodiment, the slurry process temperature is above 100° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

In another embodiment, the polymerization technique of the invention is referred to as a particle form polymerization, or a slurry process where the temperature is kept below the temperature at which the polymer goes into solution. Such technique is well known in the art, and described in for instance U.S. Pat. No. 3,248,179. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484.

In another embodiment the reactor used in the slurry process of the invention is capable of and the process of the invention is producing greater than 2000 lbs of polymer per hour (907 kg/hr), more preferably greater than 5000 lbs/hr (2268 kg/hr), and most preferably greater than 10,000 lbs/hr (4540 kg/hr). In another embodiment the slurry reactor used in the process of the invention is producing greater than 15,000 lbs of polymer per hour (6804 kg/hr), preferably greater than 25,000 lbs/hr (11,340 kg/hr) to 100,000 lbs/hr (45,500 kg/hr).

In one embodiment of the process of the invention is the process, preferably a slurry or gas phase process is operated in the presence of the catalyst system of the invention and in the absence of or essentially free of any scavengers, such as triethylaluminum, trimethylaluminum, tri-isobutylaluminum and tri-n-hexylaluminum and diethyl aluminum chloride, dibutyl zinc and the like. This process is described in WO 96/08520 and U.S. Pat. Nos. 5,712,352 and 5,763,543.

In another embodiment, the method of the invention provides for injecting a the catalyst system of the invention into a reactor, particularly a gas phase reactor. In one embodiment the catalyst system is used in the unsupported form, preferably in a liquid form such as described in U.S. Pat. Nos. 5,317,036 and 5,693,727 and EP-A-0 593 083. The polymerization catalyst in liquid form can be fed with an activator, and/or a support, and/or a supported activator together or separately to a reactor. The injection methods described in WO 97/46599 may be utilized.

In the production of polyethylene, comonomers may be present in the polymerization reactor. When present, the comonomer may be present at any level with the ethylene monomer that will achieve the desired weight percent incorporation of the comonomer into the finished resin. In one embodiment of polyethylene production, the comonomer is present with ethylene in a mole ratio range of from 0.0001 (comonomer:ethylene) to 50, and from 0.0001 to 5 in another embodiment, and from 0.0005 to 1.0 in yet another embodiment, and from 0.001 to 0.5 in yet another embodiment. Expressed in absolute terms, in making polyethylene, the amount of ethylene present in the polymerization reactor may range to up to 1000 atmospheres pressure in one embodiment, and up to 500 atmospheres pressure in another embodiment, and up to 200 atmospheres pressure in yet another embodiment, and up to 100 atmospheres in yet another embodiment, and up to 50 atmospheres in yet another embodiment.

Hydrogen gas is often used in olefin polymerization to control the final properties of the polyolefin, such as described in Polypropylene Handbook 76–78 (Hanser Publishers, 1996). Using the catalyst system of the present invention, is known that increasing concentrations (partial pressures) of hydrogen increase the melt flow rate (MFR)

and/or melt index (MI) of the polyolefin generated. The MFR or MI can thus be influenced by the hydrogen concentration. The amount of hydrogen in the polymerization can be expressed as a mole ratio relative to the total polymerizable monomer, for example, ethylene, or a blend of ethylene and hexane or propene. The amount of hydrogen used in the polymerization process of the present invention is an amount necessary to achieve the desired MFR or MI of the final polyolefin resin. In one embodiment, the mole ratio of hydrogen to total monomer ($H_2$:monomer) is in a range of from greater than 0.0001 in one embodiment, and from greater than 0.0005 in another embodiment, and from greater than 0.001 in yet another embodiment, and less than 10 in yet another embodiment, and less than 5 in yet another embodiment, and less than 3 in yet another embodiment, and less than 0.10 in yet another embodiment, wherein a desirable range may comprise any combination of any upper mole ratio limit with any lower mole ratio limit described herein. Expressed another way, the amount of hydrogen in the reactor at any time may range to up to 5000 ppm, and up to 4000 ppm in another embodiment, and up to 3000 ppm in yet another embodiment, and between 50 ppm and 5000 ppm in yet another embodiment, and between 500 ppm and 2000 ppm in another embodiment.

The activator of the present invention can be used at any level to afford a desirable polymerization activity and polymer product. In one embodiment, the mole ratio of activator to catalyst compound (based on the metal) ranges from 1000:1 to 0.01:1, and from 100:1 to 0.1:1 in a more particular embodiment; and from 10:1 to 0.5:1 in yet a more particular embodiment, and from 5:1 to 0.9:1 in yet a more particular embodiment, wherein a desirable range may include any combination of any upper ratio limit with any lower ratio limit. The catalyst system and method of polymerization of the invention may be further characterized in possessing a polymerization activity of greater than 0.5 g PE/mmole cat·hr in one embodiment, and greater than 1 g PE/mmole cat·hr in a more particular embodiment, and greater than 10 g PE/mmole cat·hr in yet a more particular embodiment. This activity is achieved for homopolymerization of ethylene or copolymerization of ethylene with another olefin monomer, in a particular embodiment, copolymerization of ethylene with one or more monomers selected from the group consisting of propene, 1-butene, 1-hexene and 1-octene in a more particular embodiment. This activity may be achieved at any desirable polymerization temperature; a temperature between 50° C. and 120° C. in one embodiment, and between 60° C. and 110° C. in another embodiment.

The catalyst system and method of the present invention is an improvement over the prior art in that, among other factors, the olefin polymerization activity of a catalyst component in combination with the activator of the invention has significantly higher activity than, for example, other known stoichiometric activators such as tris (perfluorophenyl)aluminum in combination with olefin polymerization catalyst components. In a particular embodiment, the activator of the invention is useful with metallocene catalyst components, Group 15-containing catalyst components, or a combination of the two; in a more particular embodiment, the activators of the invention are useful in combination with one or more metallocene catalyst components; and in yet a more particular embodiment, the activators of the invention are useful in combination with zirconium or hafnium containing metallocene catalyst components; and in yet a more particular embodiment, the activators of the invention are useful in combination with zirconium or hafnium containing metallocene catalyst "sandwich" components (bridged or unbridged), wherein at least one of the Cp ligands bound to the zirconium or hafnium is selected from the group consisting of indenyl, 4,5,6,7-tetrahydroinenyl, fluorenyl and substituted versions thereof, in particular, $C_1$ to $C_6$ alkyl and $C_6$ aryl substituted versions thereof.

Polymer Products

The polymers produced by the process of the invention can be used in a wide variety of products and end-use applications. The polymers produced by the process of the invention include linear low density polyethylene, elastomers, plastomers, high density polyethylenes, medium density polyethylenes, low density polyethylenes, polypropylene and polypropylene copolymers.

The polymers, typically ethylene based polymers, have a density in the range of from 0.86 g/cm³ to 0.97 g/cm³, preferably in the range of from 0.88 g/cm³ to 0.965 g/cm³, more preferably in the range of from 0.900 g/cm³ to 0.96 g/cm³, even more preferably in the range of from 0.905 g/cm³ to 0.95 g/cm³, yet even more preferably in the range from 0.910 g/cm³ to 0.940 g/cm³, and most preferably greater than 0.915 g/cm³, preferably greater than 0.920 g/cm³, and most preferably greater than 0.925 g/cm³. Density is measured in accordance with ASTM-D-1238.

The polymers produced by the process of the invention typically have a molecular weight distribution, a weight average molecular weight to number average molecular weight ($M_w/M_n$) of greater than 1.5 to 15, particularly greater than 2 to 10, more preferably greater than 2.2 to less than 8, and most preferably from 2.5 to 8.

Also, the polymers of the invention typically have a narrow composition distribution as measured by Composition Distribution Breadth Index (CDBI). Further details of determining the CDBI of a copolymer are known to those skilled in the art. See, for example, WO 93/03093. The polymers of the invention in one embodiment have CDBI's generally in the range of greater than 50% to 100%, preferably 99%, preferably in the range of 55% to 85%, and more preferably 60% to 80%, even more preferably greater than 60%, still even more preferably greater than 65%.

In another embodiment, polymers produced using a catalyst system of the invention have a CDBI less than 50%, more preferably less than 40%, and most preferably less than 30%.

The polymers of the present invention in one embodiment have a melt index (MI) or ($I_2$) as measured by ASTM-D-1238 (190/2.16) in the range from no measurable flow to 1000 dg/min, more preferably from 0.01 dg/min to 100 dg/min, even more preferably from 0.1 dg/min to 50 dg/min, and most preferably from 0.1 dg/min to 10 dg/min.

The polymers of the invention in a preferred embodiment have a melt index ratio ($I_{21}/I_2$) ($I_{21}$ is measured by ASTM-D-1238 (190/21.60)) of from preferably greater than 25, more preferably greater than 30, even more preferably greater that 40, still even more preferably greater than 50 and most preferably greater than 65. In an embodiment, the polymer of the invention may have a narrow molecular weight distribution and a broad composition distribution or vice-versa, and may be those polymers described in U.S. Pat. No. 5,798,427.

In yet another embodiment, propylene based polymers are produced in the process of the invention. These polymers include atactic polypropylene, isotactic polypropylene, hemi-isotactic and syndiotactic polypropylene. Other propylene polymers include propylene block or impact copolymers. Propylene polymers of these types are well known in the art see for example U.S. Pat. Nos. 4,794,096, 3,248,455, 4,376,851, 5,036,034 and 5,459,117.

The polymers of the invention may be blended and/or coextruded with any other polymer. Non-limiting examples of other polymers include linear low density polyethylenes, elastomers, plastomers, high pressure low density polyethylene, high density polyethylenes, polypropylenes and the like.

Polymers produced by the process of the invention and blends thereof are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

EXAMPLES

In order to provide a better understanding of the present invention including representative advantages thereof, the following examples are offered.

Racemic 5,5,6,6'-Me$_4$-3,3'-Bu$_2$-1,1'-Ph$_2$-2,2'-OH$_2$ was purchased from Strem Chemicals and used as received. Tris-pentafluorophenylaluminum was synthesized via the reaction of one equivalent of tris-pentafluorophenylborane with one equivalent of trimethylaluminum as described by Biagini et al. in U.S. Pat. No. 5,602,269. All glassware was oven dried. Anhydrous toluene & pentane were purchased from Aldrich. (1,3-MeBuCp)$_2$ZrCl$_2$, was purchased from Boulder Chemical Co. (1,3-MeBuCp)$_2$ZrMe$_2$, (nPrCp)$_2$HfMe$_2$, (CH$_2$)$_3$Si(CpMe$_4$)(Ind)ZrMe$_2$, (CH$_2$)$_4$Si(CpMe$_4$)(Cp)ZrMe$_2$, were obtained via the methylation of the corresponding metallocene dichlorides with two equivalents of a 1.4 M methyl lithium solution in diethyl ether. rac-Me$_2$Si(H$_4$Ind)$_2$ZrMe$_2$ was purchased from Witco. rac-Me$_2$Si(4-Ph-2-MeInd)$_2$ZrMe$_2$ was obtained via a procedure analogous to the synthesis published in U.S. Pat. No. 5,770,753. (CpMe$_4$)$_2$HfMe$_2$, rac-Me$_2$Si(2-MeInd)$_2$ZrMe$_2$, (p-Et$_3$SiPh)$_2$C(2,7-t-Bu$_2$Fl)(Cp)HfMe$_2$, (nPrCp)$_2$HfCl$_2$ was prepared as known in the art (Fl is fluorenyl).

Example 1

Preparation of Rac-2,2'-(3,4-Me$_2$,6-t-BuC$_6$HO)$_2$Al$_2$(C$_6$F$_5$)$_4$ 10.0 grams of Al(C$_6$F$_5$)$_3$(toluene) was slurried in 150 mls of pentane. 2.86 grams of racemic, 5,5,6,6'-Me$_4$-3,3'-Bu$_2$-1,1'-Ph$_2$-2,2'-OH$_2$ was added slowly as a solid over a fifteen minute period. The reaction stirred overnight. The solution was filtered to remove solid residues. Approximately half of the volume of pentane was evaporated under reduced pressure. The concentrated pentane solution was placed at −35° C. from which colorless crystals formed. $^1$H NMR (C$_6$D$_6$) δ {0.81 (s), 1.23 (s (br), major) -Ph-C(CH$_3$)$_3$}, {1.54 (s), 1.65 (s), 1.76 (s, major), 1.83 (s), 1.94 (s, major), 2.2 (s) —Ph—CH$_3$}. $^{19}$F NMR (C$_6$D$_6$) δ−116 (br), −120 (br), −139 (br), −147 (br), −149 (br), −158(br), −166.

Example 2

Polymerizations

Ethylene solution polymerizations, utilizing the activator complex prepared in Example 1 ("invention") were compared to olefin polymerization reactions under identical condition using Al(C$_6$F$_5$)$_3$ activator ("comparative"); in both cases the mole ratio of catalyst compound (metal) to activator is 1:1. The polymerizations were performed in a glass-lined 20-milliliter autoclave reactor equipped with a mechanical stirrer, an external heater for temperature control, a septum inlet and a regulated supply of dry nitrogen and ethylene in an inert atmosphere (Nitrogen) glove box. The reactor was dried and degassed thoroughly at 115° C. The diluent, 1-octene comonomer, and scavenger (if used), were added at room temperature and atmospheric pressure. The reactor was then brought to process pressure and charged with ethylene while stirring at 800 RPM. The activator and catalyst were added via syringe with the reactor at process conditions. The polymerization was continued while maintaining the reaction vessel within 3° C. of the target process temperature and 5 psig of target process pressure (by automatic addition of ethylene on demand) until a fixed uptake of ethylene was noted (corresponding to ca. 0.15 g polymer) or until a maximum reaction time of 20 minutes had passed; the polymerization temperature is 100° C. The reaction was stopped by pressurizing the reactor to 30 psig above the target process pressure with a gas mixture composed of 5 mol % oxygen in Argon. The polymer was recovered by vacuum centrifugation of the reaction mixture. Bulk polymerization activity was calculated by dividing the yield of polymer by the total weight of the catalyst charge by the time in hours and by the absolute monomer pressure in atmospheres. The polymerization activity was calculated by dividing the yield of polymer by the total number of millimoles of transition metal contained in the catalyst charge by the time in hours and by the absolute monomer pressure in atmospheres. Pertinent data is summarized in Table 1.

Certain features of the present invention are described in terms of a set of numerical upper limits and a set of numerical lower limits. It should be appreciated that ranges formed by any combination of these limits are within the scope of the invention unless otherwise indicated.

Unless otherwise indicated, all numbers expressing quantities of ingredients, properties, reaction conditions, and so forth, used in the specification and claims are to be understood as approximations based on the desired properties sought to be obtained by the present invention, and the error of measurement, etc., and should at least be construed in light of the number of reported significant digits and by applying ordinary rounding techniques. Notwithstanding that the numerical ranges and values setting forth the broad scope of the invention are approximations, the numerical values set forth are reported as precisely as possible.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

TABLE 1

| Catalyst | | Average Mw | Average Mn | Average PDI | Comonomer Incorporation % | Yield (g) | Activity (g/mmol*hr) |
|---|---|---|---|---|---|---|---|
| Invention | | | | | | | |
| $(1,3\text{-MeBuCp})_2ZrMe_2$ | | 411271 | 213975 | 1.9 | 2.8 | 0.0426 | 0.4 |
| $(1,3\text{-MeBuCp})_2ZrMe_2$ | | 490284 | 216602 | 2.3 | 5.8 | 0.0361 | 0.3 |
| $(1,3\text{-MeBuCp})_2ZrMe_2$ | | 398592 | 220872 | 1.8 | 2.4 | 0.0455 | 12.1 |
| | average | 433382 | 217150 | 2.0 | 3.7 | 0.0414 | 4.3 |
| | stddev | 49684 | 3481 | 0.3 | 1.9 | 0.0048 | 6.8 |
| Comparative | | | | | | | |
| $(1,3\text{-MeBuCp})_2ZrMe_2/Al(C_6F_5)_3$ | | 602864 | 271159 | 2.2 | 3.3 | 0.0188 | 0.2 |
| $(1,3\text{-MeBuCp})_2ZrMe_2/Al(C_6F_5)_3$ | | 467705 | 152619 | 3.1 | 4.2 | 0.0181 | 0.2 |
| $(1,3\text{-MeBuCp})_2ZrMe_2/Al(C_6F5)_3$ | | 426584 | 201817 | 2.1 | 3 | 0.0413 | 0.4 |
| | average | 499051 | 208532 | 2.5 | 3.5 | 0.0261 | 0.2 |
| | stddev | 92226 | 59555 | 0.6 | 0.6 | 0.0132 | 0.1 |
| Invention | | | | | | | |
| $(CpMe_4)_2HfMe_2$ | | 351077 | 191204 | 1.8 | 3.1 | 0.0484 | 8.0 |
| $(CpMe_4)_2HfMe_2$ | | 320012 | 193420 | 1.7 | 2.4 | 0.0569 | 15.1 |
| $(CpMe_4)_2HfMe_2$ | | 355207 | 203601 | 1.7 | 4.7 | 0.058 | 13.8 |
| | average | 342098 | 196075 | 1.7 | 3.4 | 0.0544 | 12.3 |
| | stddev | 19238 | 6611 | 0.1 | 1.2 | 0.0053 | 3.8 |
| Comparative | | | | | | | |
| $(CpMe_4)_2HfMe_2/Al(C_6F_5)_3$ | | | | | | 0.0012 | 0.0 |
| $(CpMe_4)_2HfMe_2/Al(C_6F_5)_3$ | | | | | | 0.0021 | 0.0 |
| $(CpMe_4)_2HfMe_2/Al(C_6F_5)_3$ | | | | | | 0.0025 | 0.0 |
| | average | | | | | 0.0019 | 0.0 |
| | stddev | | | | | 0.0007 | 0.0 |
| Invention | | | | | | | |
| $p\text{-}t\text{-}BuPh_2Si(Fl)(Cp)HfMe_2$ | | 711510 | 369006 | 1.9 | 19.9 | 0.1022 | 21.8 |
| $p\text{-}t\text{-}BuPh_2Si(Fl)(Cp)HfMe_2$ | | | | | | 0.0027 | 0.0 |
| $p\text{-}t\text{-}BuPh_2Si(Fl)(Cp)HfMe_2$ | | 843297 | 293595 | 2.9 | 21.9 | 0.0971 | 12.8 |
| | average | 777403 | 331300 | 2.4 | 20.9 | 0.0673 | 11.5 |
| | stddev | 93188 | 53324 | 0.7 | 1.4 | 0.0560 | 10.9 |
| Comparative | | | | | | | |
| $p\text{-}t\text{-}BuPh_2Si(Fl)(Cp)HfMe_2/Al(C_6F_5)_3$ | | | | | | 0.0016 | 0.0 |
| $p\text{-}t\text{-}BuPh_2Si(Fl)(Cp)HfMe_2/Al(C_6F_5)_3$ | | | | | | 2.00000E | 0.0 |
| $p\text{-}t\text{-}BuPh_2Si(Fl)(Cp)HfMe_2/Al(C_6F_5)_3$ | | | | | | 0.0014 | 0.0 |
| | average | | | | | 0.0011 | 0.0 |
| | stddev | | | | | 0.0008 | 0.0 |
| Invention | | | | | | | |
| $\text{rac-}Me_2Si(2\text{-}Me\text{-}4\text{-}PhInd)_2ZrMe_2$ | | 227794 | 102724 | 2.2 | 20.8 | 0.1695 | 163.4 |
| $\text{rac-}Me_2Si(2\text{-}Me\text{-}4\text{-}PhInd)_2ZrMe_2$ | | 218140 | 95721 | 2.3 | 21.5 | 0.17 | 163.9 |
| $\text{rac-}Me_2Si(2\text{-}Me\text{-}4\text{-}PhInd)_2ZrMe_2$ | | 284369 | 130186 | 2.2 | 9.1 | 0.1327 | 174.0 |
| | average | 243434 | 109543 | 2.2 | 17.1 | 0.1574 | 167.1 |
| | stddev | 35777 | 18216 | 0.1 | 7.0 | 0.0214 | 6.0 |
| Comparative | | | | | | | |
| $\text{rac-}Me_2Si(2\text{-}Me\text{-}4\text{-}PhInd)_2ZrMe_2/Al(C_6F5)_3$ | | 250712.5 | 150023.3 | 1.7 | 16.8 | 0.132 | 83.4 |
| $\text{rac-}Me_2Si(2\text{-}Me\text{-}4\text{-}PhInd)_2ZrMe2/Al(C_6F_5)_3$ | | 240337.4 | 99868.1 | 2.4 | 18.3 | 0.1353 | 77.5 |
| $\text{rac-}Me_2Si(2\text{-}Me\text{-}4\text{-}PhInd)_2ZeMe_2/Al(C_6F_5)_3$ | | 254054.4 | 146376.8 | 1.7 | 17.7 | 0.14 | 82.8 |
| | average | 248368 | 132089 | 1.9 | 17.6 | 0.1358 | 81.2 |
| | stddev | 7153 | 27964 | 0.4 | 0.8 | 0.0040 | 3.2 |
| Invention | | | | | | | |
| $Si\text{—}(CH_2)_4(CpMe_4)(Cp)ZrMe_2$ | 4 | | | | | 0.0086 | 0.1 |
| $Si\text{—}(CH_2)_4(CpMe_4)(Cp)ZrMe_2$ | 5 | | | | | 0.008 | 0.1 |
| $Si\text{—}(CH_2)_4(CpMe_4)(Cp)ZrMe_2$ | 6 | | | | | 0.0003 | 0.0 |
| | average | | | | | 0.0056 | 0.1 |
| | stddev | | | | | 0.0046 | 0.0 |
| Invention | | | | | | | |
| $Me_2Si(CpMe_4)(Fl)ZrMe_2$ | 4 | 287438 | 185048 | 1.6 | 2.6 | 0.0525 | 27.5 |
| $Me_2Si(CpMe_4)(Fl)ZrMe_2$ | 5 | 239163 | 106126 | 2.3 | 3.7 | 0.0593 | 31.1 |
| $Me_2Si(CpMe_4)(Fl)ZrMe_2$ | 6 | 287576 | 178070 | 1.6 | 6.2 | 0.0624 | 20.4 |
| | average | 271392 | 156415 | 1.8 | 4.2 | 0.0581 | 26.3 |
| | stddev | 27911 | 43691 | 0.4 | 1.8 | 0.0051 | 5.4 |
| Invention | | | | | | | |
| $Si\text{—}(CH_2)_3(CpMe_4)(Ind)ZrMe_2$ | 4 | 61816 | 40292 | 1.5 | 5.7 | 0.0547 | 25.7 |

TABLE 1-continued

| Catalyst | | Average Mw | Average Mn | Average PDI | Comonomer Incorporation % | Yield (g) | Activity (g/mmol*hr) |
|---|---|---|---|---|---|---|---|
| Si—(CH$_2$)$_3$(CpMe$_4$)(Ind)ZrMe$_2$ | 5 | 64138 | 42870 | 1.5 | 5.6 | 0.0659 | 37.8 |
| Si—(CH$_2$)$_3$(CpMe$_4$)(Ind)ZrMe$_2$ | 6 | 64767 | 40957 | 1.6 | 19 | 0.0578 | 21.2 |
| | average | 63573 | 41373 | 1.5 | 10.1 | 0.0595 | 28.3 |
| | stddev | 1554 | 1338 | 0.1 | 7.7 | 0.0058 | 8.6 |
| Invention | | | | | | | |
| (nPrCp)$_2$HfMe$_2$ | 4 | | | | | 0.0034 | 0.0 |
| (nPrCp)$_2$HfMe$_2$ | 5 | | | | | 0.0013 | 0.0 |
| (nPrCp)$_2$HfMe$_2$ | 6 | | | | | 0.0011 | 0.0 |
| | average | | | | | 0.0019 | 0.0 |
| | stddev | | | | | 0.0013 | 0.0 |
| Invention | | | | | | | |
| rac-Me$_2$Si(2-MeInd)ZrMe$_2$ | 4 | 156364 | 102061 | 1.5 | 5.5 | 0.0927 | 80.9 |
| rac-Me$_2$Si(2-MeInd)ZrMe$_2$ | 5 | 145000 | 88455 | 1.6 | 5.7 | 0.0946 | 86.3 |
| rac-Me$_2$Si(2-MeInd)ZrMe$_2$ | 6 | 144396 | 91844 | 1.6 | 5.5 | 0.0612 | 50.8 |
| | average | 148587 | 94120 | 1.6 | 5.6 | 0.0828 | 72.7 |
| | stddev | 6742 | 7083 | 0.1 | 0.1 | 0.0188 | 19.1 |
| Invention | | | | | | | |
| rac-Me$_2$Si(2-Me-4-PhInd)$_2$ZrMe$_2$ | 4 | 205643 | 119202 | 1.7 | 18.5 | 0.1474 | 180.5 |
| rac-Me$_2$Si(2-Me-4-PhInd)$_2$ZrMe$_2$ | 5 | 165506 | 85291 | 1.9 | 20.2 | 0.1517 | 173.4 |
| | average | 185575 | 102247 | 1.8 | 19.4 | 0.496 | 176.9 |
| | stddev | 28381 | 23979 | 0.1 | 1.2 | 0.003 | 5.0 |
| Invention | | | | | | | |
| rac-Me$_2$Si(H$_4$-Ind)$_2$ZrMe$_2$ | 4 | | | | | 0.0055 | 0.0 |
| rac-Me$_2$Si(H$_4$-Ind)$_2$ZrMe$_2$ | 5 | | | | | 0.0041 | 0.0 |
| rac-Me$_2$Si(H$_4$-Ind)$_2$ZrMe$_2$ | 6 | | | | | 0.0086 | 0.1 |
| | average | | | | | 0.0061 | 0.1 |
| | stddev | | | | | 0.0023 | 0.0 |
| Invention | | | | | | | |
| Me$_2$SiMe$_4$Cp(C$_{12}$H$_{23}$N)TiMe$_2$ | 1 | 378637 | 119757 | 3.2 | 16.2 | 0.002 | 0.0 |
| Me$_2$SiMe$_4$Cp(C$_{12}$H$_{23}$N)TiMe$_2$ | 2 | | | | | 0.005 | 0.0 |
| Me$_2$SiMe$_4$Cp(C$_{12}$H$_{23}$N)TiMe$_2$ | 3 | 439205 | 188664 | 2.3 | 13.8 | 0.038 | 0.3 |
| | average | 408921 | 154210 | 2.8 | 15.0 | 0.0153 | 0.1 |
| | stddev | 42828 | 48725 | 0.6 | 1.7 | 0.0204 | 0.2 |
| Invention | | | | | | | |
| {[(2,4,6-Me$_3$C$_6$H$_2$)NCH$_2$CH$_2$]$_2$NH}Hf(CH$_2$Ph)$_2$ | 4 | | | | | 0.0014 | 0.0 |
| {[(2,4,6-Me$_3$C$_6$H$_2$)NCH$_2$CH$_2$]$_2$NH}Hf(CH$_2$Ph)$_2$ | 5 | | | | | 0.0005 | 0.0 |
| {[(2,4,6-Me$_3$C$_6$H$_2$)NCH$_2$CH$_2$]$_2$NH}Hf(CH$_2$Ph)$_2$ | 6 | | | | | 0.0010 | 0.0 |
| | average | | | | | 0.0010 | 0.0 |
| | stddev | | | | | 0.0005 | 0.0 |

What is claimed is:

1. A catalyst system comprising a catalyst compound and an activator compound, wherein the activator compound is represented by:

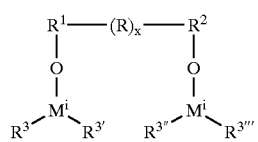

wherein each $M^i$ is a Group 13 atom;

each $R^3$, $R^{3'}$, $R^{3''}$, and $R^{3'''}$ group is independently selected from: $C_1$ to $C_{30}$ alkyls, $C_1$ to $C_{30}$ heteroatom containing alkyls, halogenated $C_1$ to $C_{30}$ alkyls, $C_1$ to $C_{30}$ alkoxys, halogenated $C_1$ to $C_{30}$ alkoxys, $C_2$ to $C_{30}$ alkenyls, $C_6$ to $C_{60}$ aryls, $C_6$ to $C_{60}$ aryloxys, halogenated $C_6$ to $C_{60}$ aryloxys, and $C_6$ to $C_{60}$ halogenated aryls; with the proviso that at least one of $R^3$, $R^{3'}$, $R^{3''}$, and $R^{3'''}$ is a fluorinated $C_6$ to $C_{60}$ aryl group $R^1$ and $R^2$ are independently selected from substituted or unsubstituted $C_1$ to $C_{100}$ hydrocarbylenes, aliphatic or aromatic;

R, when present, is a substituted or unsubstituted $C_{30}$ hydrocarbylene, aliphatic or aromatic; wherein when R is absent, $R^1$ and $R^2$ are bound together; and x is 0 or an integer from 1 to 100.

2. The catalyst system of claim 1, wherein each $M^1$ is boron or aluminum.

3. The catalyst system of claim 1, wherein each $M^1$ is aluminum.

4. The catalyst system of claim 1, wherein the activator is represented by:

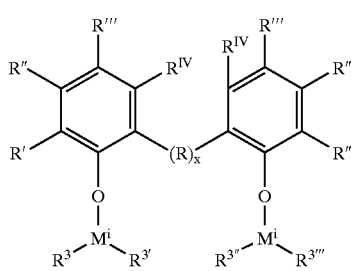

wherein each of R, $R^1$, $R^2$, $R^3$ through $R^{3'''}$, x and $M^i$ are as defined in claim 1; and wherein each of R', R", R'" and $R^{IV}$ are independently selected from halogen radicals, hydrogen radicals, hydroxys, carboxyls, $C_1$ to $C_{10}$ alkyls, $C_1$ to $C_{10}$ alkoxys, $C_2$ to $C_{10}$ alkylenes, $C_6$ to $C_{12}$ aryls, $C_6$ to $C_{12}$ aryloxys, $C_7$ to $C_{15}$ alkylaryls.

5. The catalyst system of claim 1, wherein each of $R^3$, $R^{3'}$, $R^{3''}$, and $R^{3'''}$ is a fluorinated phenyl group.

6. The catalyst system of claim 1, wherein $R^1$ and $R^2$ are independently selected from substituted or unsubstituted $C_1$ to $C_{100}$ linear or branched alkylenes, $C_2$ to $C_{100}$ alkenylenes, $C_1$ to $C_{100}$ cycloalkylenes, $C_1$ to $C_{100}$ aryls, $C_1$ to $C_{100}$ aryl substituted alkyls, $C_1$ to $C_{100}$ alkyl substituted aryls, $C_1$ to $C_{100}$ acyls, $C_1$ to $C_{100}$ aroyls; $C_1$ to $C_{100}$ alkoxys, and $C_1$ to $C_{100}$ aryloxys.

7. The catalyst system of claim 1, wherein each $M^i$ is Al; $R^1$ and $R^2$ are $C_1$ to $C_{50}$ alkyl or alkyl substituted aryl groups; x is 0, and each of $R^3$, $R^{3'}$, $R^{3''}$, and $R^{3'''}$ is a perfluorinated phenyl group.

8. The catalyst system of claim 1, wherein the catalyst compound is a metallocene catalyst component, a Group 15-containing metal polymerization catalyst composition, a phenoxide transition metal catalyst composition or a combination thereof.

9. The catalyst system of claim 1, wherein the catalyst system is supported on a carrier.

10. A process for polymerizing olefins comprising combining one or more olefins with a catalyst system comprising a catalyst compound and an activator compound, wherein the activator compound is represented by:

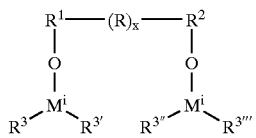

wherein each $M^i$ is a Group 13 atom;
each $R^3$, $R^{3'}$, $R^{3''}$, and $R^{3'''}$ group is independently selected from: $C_1$ to $C_{30}$ alkyls, $C_1$ to $C_{30}$ heteroatom containing alkyls, $C_1$ to $C_{30}$ alkoxys, halogenated $C_1$ to $C_{30}$ alkoxys, $C_2$ to $C_{30}$ alkenyls, $C_6$ to $C_{60}$ aryls, $C_6$ to $C_{60}$ aryloxys, halogenated $C_6$ to $C_{60}$ aryloxys, and $C_6$ to $C_{60}$ halogenated aryls; with the proviso that at least one of $R^3$, $R^{3'}$, $R^{3''}$, and $R^{3'''}$ is a fluorinated $C_6$ to $C_{60}$ aryl group $R^1$ and $R^2$ are independently selected from substituted or unsubstituted $C_1$ to $C_{100}$ hydrocarbylenes, aliphatic or aromatic;

R, when present, is a substituted or unsubstituted $C_{30}$ hydrocarbylene aliphatic or aromatic group; wherein when R is absent, $R^1$ and $R^2$ are bound together; and x is 0 or an integer from 1 to 100.

11. The polymerization process of claim 10, wherein each $M^1$ is boron or aluminum.

12. The polymerization process of claim 10, wherein each $M^1$ is aluminum.

13. The polymerization process of claim 10, wherein the activator is represented by:

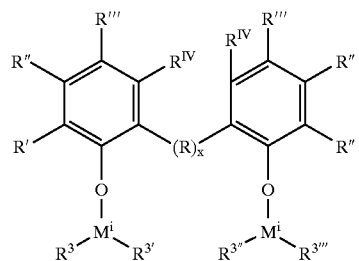

wherein each of R, $R^1$, $R^2$, $R^3$ through $R^{3'''}$, x and $M^i$ are as defined in claim 1; and
wherein each of R', R", R'" and $R^{IV}$ are independently selected from halogen radicals, hydrogen radicals, hydroxys, carboxyls, $C_1$ to $C_{10}$ alkyls, $C_1$ to $C_{10}$ alkoxys, $C_2$ to $C_{10}$ alkylenes, $C_6$ to $C_{12}$ aryls, $C_6$ to $C_{12}$ aryloxys, $C_7$ to $C_{15}$ alkylaryls.

14. The polymerization process of claim 10, wherein each of $R^3$, $R^{3'}$, $R^{3''}$, and $R^{3'''}$ is a fluorinated phenyl group.

15. The polymerization process of claim 10, wherein $R^1$ and $R^2$ are independently selected from substituted or unsubstituted $C_1$ to $C_{100}$ linear or branched alkylenes, $C_2$ to $C_{100}$ alkenylenes, $C_1$ to $C_{100}$ cycloalkylenes, $C_1$ to $C_{100}$ aryls, $C_1$ to $C_{100}$ aryl substituted alkyls, $C_1$ to $C_{100}$ alkyl substituted aryls, $C_1$ to $C_{100}$ acyls, $C_1$ to $C_{100}$ aroyls, $C_1$ to $C_{100}$ alkoxys, and $C_1$ to $C_{100}$ aryloxys.

16. The polymerization process of claim 10, wherein each $M^i$ is Al; $R^1$ and $R^2$ are $C_1$ to $C_{50}$ alkyl or alkyl substituted aryl groups; x is 0, and each of $R^3$, $R^{3'}$, $R^{3''}$, and $R^{3'''}$ is a perfluorinated phenyl group.

17. The polymerization process of claim 10, wherein the catalyst compound is a metallocene catalyst component, a Group 15-containing metal polymerization catalyst composition, a phenoxide transition metal catalyst composition or a combination thereof.

18. The polymerization process of claim 10, wherein the catalyst system is supported on a carrier.

19. The polymerization process of claim 10, wherein the olefins comprise ethylene and one or more olefins selected from $C_3$ to $C_{10}$ olefins.

20. The polymerization process of claim 10, wherein the process is a gas phase or slurry phase process and wherein the catalyst system is a supported catalyst system.

* * * * *